United States Patent [19]
Kiuchi

[11] Patent Number: 5,440,747
[45] Date of Patent: Aug. 8, 1995

[54] DATA PROCESSOR WITH CONTROL LOGIC FOR STORING OPERATION MODE STATUS AND ASSOCIATED METHOD

[75] Inventor: Atsushi Kiuchi, Kunitachi, Japan

[73] Assignee: Hitachi America, Ltd., Tarrytown, N.Y.

[21] Appl. No.: 127,679

[22] Filed: Sep. 27, 1993

[51] Int. Cl.$^6$ .......................... G06F 13/14; G06F 1/32
[52] U.S. Cl. .................... 395/375; 395/750; 395/500; 395/800; 395/842; 395/879; 395/775; 395/739
[58] Field of Search ............... 395/750, 725, 425, 325, 395/500; 364/200

[56] References Cited

U.S. PATENT DOCUMENTS

| | | |
|---|---|---|
| 4,498,135 | 2/1985 | Caudel . |
| 4,503,500 | 3/1985 | Magar . |
| 4,935,867 | 6/1990 | Wang et al. . |
| 4,980,836 | 12/1990 | Carter et al. ........................ 364/200 |
| 5,175,845 | 12/1992 | Little ................................... 395/750 |
| 5,185,878 | 2/1993 | Baror et al. ........................ 395/425 |
| 5,203,000 | 4/1993 | Folkes et al. ...................... 395/750 |
| 5,241,680 | 8/1993 | Cole et al. ......................... 395/750 |
| 5,287,458 | 2/1994 | Michael et al. .................... 395/250 |
| 5,313,618 | 5/1994 | Pawloski ............................ 395/500 |
| 5,325,359 | 6/1994 | Jordan et al. ...................... 395/325 |
| 5,329,471 | 7/1994 | Swoboda et al. .................. 395/500 |

*Primary Examiner*—Jack B. Harvey
*Assistant Examiner*—David A. Wiley
*Attorney, Agent, or Firm*—Flehr, Hohbach, Test, Albritton & Herbert

[57] ABSTRACT

A data processor that includes an interrupt controller, a condition code register, a condition code stacking register, a data memory with a stacking area, a data processing unit, and an interrupt request decoder. The interrupt controller receives interrupt request signals including a break interrupt request signal and a plurality of standard interrupt request signals. The condition code register stores condition code values including a data processor mode control value. The data processing unit performs data processing operations. The data processing operations are suspended when the data processor mode control value is set to a predefined "sleep mode" value and are enabled when the data processor mode control value is set to a predefined "run mode". The interrupt decoder responds to a received break interrupt request signal by generating: (A) first, condition code register control signals to copy the mode control value stored in the condition code register into the condition code stacking register, (B) second, condition code register control signals to set the mode control value to the predefined "run mode" value. It responds to a standard interrupt request signal by generating: (A) first, condition code register control signals to set the mode control value to the predefined "run mode" value; and (B), second, condition code register control signals to copy the mode control value stored in the condition code register into the data stacking area.

10 Claims, 25 Drawing Sheets

Figure 3(a)

| Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | Type | Instructions |
|---|---|---|---|---|---|---|---|---|---|---|---|---|---|---|---|---|---|---|---|---|---|---|---|---|---|---|
| | MEM load 0:Rq=*Am 1:Rq=*Am++ 2:Rq=*Am-- 3:Rq=*Am++io | | Am 0:xa0 1:xa1 2:ya1 3:ya2 | | Rq | DST 0:a0 1:a1 | SRC 0:a0 1:a1 2:mo 3:m1 4:xd0 5:xd1 6:yd0 7:yd1 | | | 0 | 0 | 0 | 0 | Rq 0:xd0l 1:xd1l 2:yd0l 3:yd1l | 0 | 1 | 1 | 1 | 1 | 1 | 1 | 1 | 1 | 1 | 1144 two operand register-regsiter instruction with one load | DST=test(SRC) (#7)<br>DST=clear (#7)<br>DST=SRC<br>DST=abs(SRC) |
| | | | | | | | | | | 1 | 0 | 0 | 0 | | | | | | | | | | | | | |
| | | | | | | | | | | 0 | 1 | 0 | 0 | | | | | | | | | | | | | |
| | | | | | | | | | | 1 | 1 | 0 | 0 | | | | | | | | | | | | | |
| | | | | | | | | | | 0 | 0 | 1 | 0 | | | | | | | | | | | | | DST=round(SRC)<br>DST=SRC<br>DST.i=test(SRC.i) (#7)<br>DST.i=clear (#7) |
| | | | | | | | | | | 1 | 0 | 1 | 0 | | | | | | | | | | | | | |
| | | | | | | | | | | 0 | 1 | 1 | 0 | | | | | | | | | | | | | |
| | | | | | | | | | | 1 | 1 | 1 | 0 | | | | | | | | | | | | | |
| | | | | | | | | | | 0 | 0 | 0 | 1 | | | | | | | | | | | | | DST.i=SRC.i<br>DST.i=abs(SRC.i) (#6) |
| | | | | | | | | | | 1 | 0 | 0 | 1 | | | | | | | | | | | | | |
| | | | | | | | | | | 0 | 1 | 0 | 1 | | | | | | | | | | | | | |
| | | | | | | | | | | 1 | 1 | 0 | 1 | | | | | | | | | | | | | |
| | | | | | | | | | | 0 | 0 | 1 | 1 | | | | | | | | | | | | | DST.i=round(SRC.i)<br>DST.i=SRC.i |
| | | | | | | | | | | 1 | 0 | 1 | 1 | | | | | | | | | | | | | |
| | | | | | | | | | | 0 | 1 | 1 | 1 | | | | | | | | | | | | | |
| | | | | | | | | | | 1 | 1 | 1 | 1 | | | | | | | | | | | | | |
| | MEM store 0:*Am=Rp 1:*Am++=Rp 2:*Am--=Rp 3:*Am++io=Rp | | | | Rp 0:a0h 1:a1h | | | | | 0 | 0 | 0 | 0 | 0 | 1 | 1 | 1 | 1 | 1 | 1 | 1 | 1 | 1 | 1 | 1145 two operand register-regsiter instruction with one store | same as above |
| | | | | | | | | | | 1 | 0 | 0 | 0 | | | | | | | | | | | | | |
| | | | | | | | | | | 0 | 1 | 0 | 0 | | | | | | | | | | | | | |
| | | | | | | | | | | 1 | 1 | 0 | 0 | | | | | | | | | | | | | |
| | | | | | | | | | | 0 | 0 | 1 | 0 | | | | | | | | | | | | | |
| | | | | | | | | | | 1 | 0 | 1 | 0 | | | | | | | | | | | | | |
| | | | | | | | | | | 0 | 1 | 1 | 0 | | | | | | | | | | | | | |
| | | | | | | | | | | 1 | 1 | 1 | 0 | | | | | | | | | | | | | |
| | | | | | | | | | | 0 | 0 | 0 | 1 | | | | | | | | | | | | | |
| | | | | | | | | | | 1 | 0 | 0 | 1 | | | | | | | | | | | | | |
| | | | | | | | | | | 0 | 1 | 0 | 1 | | | | | | | | | | | | | |
| | | | | | | | | | | 1 | 1 | 0 | 1 | | | | | | | | | | | | | |
| | | | | | | | | | | 0 | 0 | 1 | 1 | | | | | | | | | | | | | |
| | | | | | | | | | | 1 | 0 | 1 | 1 | | | | | | | | | | | | | |
| | | | | | | | | | | 0 | 1 | 1 | 1 | | | | | | | | | | | | | |
| | | | | | | | | | | 1 | 1 | 1 | 1 | | | | | | | | | | | | | |

(#6) "i" means integer arithmetic operation
(#7) in case of clear instruction, SRC is ignored

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1138 six op. RR instruction with one load | D1=SRCX1 + SRCY1<br>D2.u=SRCX2.s * SRCY2.s<br>D1=SRCX1 - SRCY1<br>D2.u=SRCX2.s * SRCY2.s | 1 | 1 | 1 | 0 | 1 | Rq | 1<br>0 | SRCX1<br>0:a0 1:a1 3:m1 5:xd1<br>2:m0 3:m1 5:xd1<br>4:xd0 5:xd1<br>6:yd0 7:yd1 | | SRCY1<br>0:a0 1:a1<br>2:m0 3:m1<br>4:xd0 5:xd1<br>6:yd0 7:yd1 | | | | D1<br>0:a0 1:a1 | | SRCX2<br>0:a0<br>1:a1<br>2:xd0<br>3:xd1 | | SRCY2<br>0:a0<br>1:a1<br>2:yd0<br>3:yd1 | | D2<br>0:m0 1:m1 | Rq | Am | | MEM load | |
| 1139 six op. RR instruction with one store | (#3)<br>same as above | 1 | 1 | 1 | 0 | 0 | 1 | 1<br>0 | | | | | | | | | | | | | | | | | MEM store | |
| 1142 three operand register-register instruction with one load | DST=SRC1 + SRC2<br>DST=SRC1 - SRC2<br>DST.u=SRC1.s * SRC2.s (#3)<br>DST.l=SRC1.s * SRC2.s<br>DST.r=(SRC1 + SRC2).shb<br>DST.r=(SRC1 - SRC2).shb<br>DST.r=SRC1 + SRC2.sha (#1)<br>DST.r=SRC1 - SRC2.sha | 1 | 1 | 1 | 1 | 1 | 1 | 1 | Rq | | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 | SRC1<br>0:a0<br>1:a1<br>2:m0<br>3:m1<br>4:xd0<br>5:xd1<br>6:yd0<br>7:yd1 | | | | SRC2<br>0:a0<br>1:a1<br>2:m0<br>3:m1<br>4:xd0<br>5:xd1<br>6:yd0<br>7:yd1 | | DST 0:a0 1:a1 (ALU) 0:m0 1:m1 (MLT) | Rq | | | MEM load | |
| 1143 three operand register-register instruction with one store | same as above | 1 | 1 | 1 | 1 | 1 | 1 | 1 | 0 | | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 | | | | | | | | Rp | | | MEM store | |

(#1) "r" means rounded result, "sha" means shift amount value is given by sha register, "shb" means shift amount value is given by shb register
(#3) "s" means signed data, "us" means unsigned data, "u" means upper part of mult. result, "l" means lower part of mult. result

Figure 3(b)

| Bit | 1140: two operand register-register instruction with one load and one store | 1141: two operand register-register instruction with two loads |
|---|---|---|
| 0,1 | MEMA load/store  0:Rl,s,*Aa  1:Rl,s,*Aa++  2:Rl,s,*Aa--  3:Rl,s,*Aa++io | MEMA load  0:Ra=*Aa  1:Ra=*Aa++  2:Ra=*Aa--  3:Ra=*Aa++io |
| 2 | Aa  0:xa0  1:xa1 | |
| 3,4 | MEMB load/store  0:Rl,s,*Ab  1:Rl,s,*Ab++  2:Rl,s,*Ab--  3:Rl,s,*Ab++io | MEMB load  0:Rb=*Aa  1:Rb=*Aa++  2:Rb=*Aa--  3:Rb=*Aa++io |
| 5 | Ab  0:ya0  1:ya1 | |
| 6 | Rs  0:a0h  1:a1h | Ra  0:xd0h  1:xd1h |
| 7 | Rl  0:xd0h  1:xd1h or 0:yd0h  1:yd1h | Rb  0:yd0h  1:yd1h |
| 8 | DST | |
| 9,10,11 | SRC | |
| 12 | 0 1 0 1 0 1 0 1 0 1 0 1 0 1 0 1 | 0 1 0 1 0 1 0 1 0 1 0 1 0 1 0 1 |
| 13 | 0 0 1 1 0 0 1 1 0 0 1 1 0 0 1 1 | 0 0 1 1 0 0 1 1 0 0 1 1 0 0 1 1 |
| 14 | 0 0 0 0 1 1 1 1 0 0 0 0 1 1 1 1 | 0 0 0 0 1 1 1 1 0 0 0 0 1 1 1 1 |
| 15 | 0 0 0 0 0 0 0 0 1 1 1 1 1 1 1 1 | 0 0 0 0 0 0 0 0 1 1 1 1 1 1 1 1 |
| 16 | St  0:Xst  1:Yst | 0 |
| 17 | 0 | 0 |
| 18 | 0 | 1 |
| 19 | 1 | 1 |
| 20 | 1 | 1 |
| 21 | 1 | 1 |
| 22 | 1 | 1 |
| 23 | 1 | 1 |
| Instructions | DST=test(SRC)  (#7)<br>DST=clear<br>DST=SRC<br>DST=abs(SRC)<br>DST=round(SRC)<br>DST=~SRC<br>DST.i=test(SRC.i)  (#7)<br>DST.i=clear<br>DST.i=SRC.i<br>DST.i=abs(SRC.i)  (#6)<br>DST.i=inc(SRC.i)<br>DST.i=dec(SRC.i) | same as above |

Figure 3(c)

| Type | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | Instructions |
|---|---|---|---|---|---|---|---|---|---|---|---|---|---|---|---|---|---|---|---|---|---|---|---|---|---|
| 1134 six op. RR instr. with one load one store | 1 | 0 | St | 0 | SRCX1 | | | SRCY1 | | | D1 | SRCX2 | | SRCY2 | D2 | Rl | Rs | Ab | MEMB load/ store | | Aa | MEMA load/ store | | | D1=SRCX1 + SRCY1<br>D2.u=SRCX2.s * SRCY2.s<br>D1=SRCX1 − SRCY1<br>D2.u=SRCX2.s * SRCY2.s |
| 1135 six op. RR instruction with two loads | 1 | 1 | 0 | 0 | | | | | | | | | | | | | Rb | Ra | | MEMB load | | | MEMA load | | (#3)<br>same as above |
| 1136 three operand register-register instruction with one load | 1 | 1 | 1 | 0 | St | 0 | 0 0 0 0 1 1 1 1 | 0 0 1 1 0 0 1 1 | 0 1 0 1 0 1 0 1 | SRC1 | | | | SRC2 | | DST | Rl | Rs | Ab | MEMB load/ store | | | MEMA load/ store | | DST=SRC1 + SRC2<br>DST=SRC1 − SRC2<br>DST.u=SRC1.s * SRC2.s  (#3)<br>DST.l=SRC1.s * SRC2.s<br>DST.r=(SRC1 + SRC2).shb<br>DST.r=(SRC1 − SRC2).shb<br>DST.r=SRC1 + SRC2.sha  (#1)<br>DST.r=SRC1 − SRC2.sha |
| 1137 three operand register-register instruction with one store | 1 | 1 | 1 | 1 | 0 | 0 | 0 0 0 0 1 1 1 1 | 0 0 1 1 0 0 1 1 | 0 1 0 1 0 1 0 1 | SRC1 | | | | SRC2 | | | Rb | Ra | | MEMB load | | | MEMA load | | same as above |

| Type | Instructions | 23 | 22 | 21 | 20 | 19 | 18 | 17 | 16 | 15 | 14 | 13 | 12 | 11 | 10 | SRC (9-7) | DST (6-4) | CC (3-0) |
|------|--------------|----|----|----|----|----|----|----|----|----|----|----|----|----|----|-----------|-----------|----------|
| two operand register-register instruction with condition code (1159) | [if cc] DST=test(SRC)  (#7) | 0 | 0 | 0 | 0 | 0 | 0 | 0 | 1 | 0 | | | | | | SRC | DST: 0:a0, 1:a1, 2:mo, 3:m1, 4:xd0, 5:xd1, 6:yd0, 7:yd1 | CC: 0:uncond. & CC=enable, 1:CCD, 2:if CC, 3:if CS, 4:if P, 5:if N, 6:if NZ, 7:if Z, 8:if GE, 9:if LT, A:if GT, B:if LE, C:if UGT, D:if ULT, E:if V, F:if UO |
| | [if cc] DST=clear | | | | | | | | | | | | | | | | | |
| | [if cc] DST=SRC | | | | | | | | | | | | | | | | | |
| | [if cc] DST=abs(SRC) | | | | | | | | | | | | | | | | | |
| | [if cc] DST=round(SRC) | | | | | | | | | | | | | | | | | |
| | [if cc] DST=~SRC | | | | | | | | | | | | | | | | | |
| | [if cc] DST.i=test(SRC.i)  (#7) | | | | | | | | | | | | | | | | | |
| | [if cc] DST.i=clear | | | | | | | | | | | | | | | | | |
| | [if cc] DST.i=SRC.i | | | | | | | | | | | | | | | | | |
| | [if cc] DST.i=abs(SRC.i)  (#6) | | | | | | | | | | | | | | | | | |
| | [if cc] DST.i=inc(SRC.i) | | | | | | | | | | | | | | | | | |
| | [if cc] DST.i=dec(SRC.i) | | | | | | | | | | | | | | | | | |
| | [if cc] DST.i=bpen(SRC) | | | | | | | | | | | | | | | | | |
| | [if cc] DST.i=dmsb(SRC) | | | | | | | | | | | | | | | | | |

Figure 3(f)

| Type | Instructions | 23 | 22 | 21 | 20 | 19 | 18 | 17 | 16 | 15 | 14 | 13 | 12 11 10 | 9 8 7 | 6 5 4 | 3 2 1 0 |
|---|---|---|---|---|---|---|---|---|---|---|---|---|---|---|---|---|
| two operand register-register instruction with condition code (1151) | [if cc] DST=SCR1 + SRC2 | 0 | 0 | 1 | 1 | 1 | 0 | 0 | 0 | 0 | 0 | 0 | SRC1 | SRC2 | DST | CC |
| | [if cc] DST=SCR1 - SRC2 | | | | | | 0 | 0 | 0 | 0 | 0 | 1 | | | | |
| | [if cc] DST.u=SCR1.s * SRC2.s | | | | | | 0 | 0 | 0 | 0 | 1 | 0 | | | | |
| | [if cc] DST.l=SCR1.s * SRC2.s (#1) | | | | | | 0 | 0 | 0 | 0 | 1 | 1 | | | | |
| | [if cc] DST.r=(SCR1 + SRC2).shb | | | | | | 0 | 0 | 0 | 1 | 0 | 0 | | | | |
| | [if cc] DST.r=(SCR1 - SRC2).shb | | | | | | 0 | 0 | 0 | 1 | 0 | 1 | | | | |
| | [if cc] DST=SCR1 + SRC2.sha | | | | | | 0 | 0 | 0 | 1 | 1 | 0 | | | | |
| | [if cc] DST=SCR1 - SRC2.sha | | | | | | 0 | 0 | 0 | 1 | 1 | 1 | | | | |
| | [if cc] DST.l=SCR1.i + SRC2.i | | | | | | 0 | 0 | 1 | 0 | 0 | 0 | | | | |
| | [if cc] DST.l=SCR1.i - SRC2.i | | | | | | 0 | 0 | 1 | 0 | 0 | 1 | | | | |
| | [if cc] DST.u=SCR1.i * SRC2.i | | | | | | 0 | 0 | 1 | 0 | 1 | 0 | | | | |
| | [if cc] DST.l=SCR1.i * SRC2.i (#6) | | | | | | 0 | 0 | 1 | 0 | 1 | 1 | | | | |
| | [if cc] DST.r=(SCR1 + SRC2).sha | | | | | | 0 | 0 | 1 | 1 | 0 | 0 | | | | |
| | [if cc] DST.r=(SCR1 - SRC2).sha | | | | | | 0 | 0 | 1 | 1 | 0 | 1 | | | | |
| | [if cc] DST=SCR1 + SRC2.shb | | | | | | 0 | 0 | 1 | 1 | 1 | 0 | | | | |
| | [if cc] DST=SCR1 - SRC2.shb | | | | | | 0 | 0 | 1 | 1 | 1 | 1 | | | | |
| | [if cc] DST=SCR1 + SRC2 + carry | | | | | | 0 | 1 | 0 | 0 | 0 | 0 | | | | |
| | [if cc] DST=SCR1 - SRC2 - carry | | | | | | 0 | 1 | 0 | 0 | 0 | 1 | | | | |
| | [if cc] DST.u=SCR1.us * SRC2.s | | | | | | 0 | 1 | 0 | 0 | 1 | 0 | | | | |
| | [if cc] DST.l=SCR1.us * SRC2.s (#3) | | | | | | 0 | 1 | 0 | 0 | 1 | 1 | | | | |
| | [if cc] DST.u=SCR1.us * SRC2.us | | | | | | 0 | 1 | 0 | 1 | 0 | 0 | | | | |
| | [if cc] DST.l=SCR1.us * SRC2.us | | | | | | 0 | 1 | 0 | 1 | 0 | 1 | | | | |
| | SCR1 - SRC2 | | | | | | 0 | 1 | 0 | 1 | 1 | 0 | | | | 0 0 0 DST 0 0 0 CC 0 |
| | SCR1.i - SRC2.i (#2) | | | | | | 0 | 1 | 0 | 1 | 1 | 1 | | | | |
| | [if cc] DST=SCR1 <<l SRC2.i | | | | | | 0 | 1 | 1 | 0 | 0 | 0 | | | | |
| | [if cc] DST=SCR1 <<a SRC2.i | | | | | | 0 | 1 | 1 | 0 | 0 | 1 | | | | |
| | [if cc] DST=SCR1 <<r SRC2.i | | | | | | 0 | 1 | 1 | 0 | 1 | 0 | | | | |
| | [if cc] DST=SCR1 <<rc SRC2.i | | | | | | 0 | 1 | 1 | 0 | 1 | 1 | | | | |
| | [if cc] DST=SCR1 & SRC2 | | | | | | 0 | 1 | 1 | 1 | 0 | 0 | | | | |
| | [if cc] DST=SCR1 | SRC2 | | | | | | 0 | 1 | 1 | 1 | 0 | 1 | | | | |
| | [if cc] DST=SCR1 ^ SRC2 | | | | | | 0 | 1 | 1 | 1 | 1 | 0 | | | | |

(#2) if SRC2 is positive, it means left shift; if SRC2 is negative, it means right shift.

| | | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| Type | Instructions | | | | | | | | | | | | | SRC1 | | | SRC2 | | | DST | | | CC | | |
| two operand regsiter-register instruction with condition code | [if cc] DST=bit_clear(SRC1,SRC2.i) | 0 | 0 | 1 | 1 | 1 | 1 | 0 | 0 | 0 | 0 | 0 | | | | | | | | | | | | | |
| | [if cc] DST=bit_set(SRC1,SRC2.i) | | | | | | 1 | 0 | 0 | 0 | 0 | 1 | | | | | | | | | | | | | |
| | [if cc] DST=bit_comp(SRC1,SRC2.i) | | | | | | 1 | 0 | 0 | 0 | 1 | 0 | | | | | | | | | | | | | |
| | bit_test(SRC1,SRC2.i) | | | | | | 1 | 0 | 0 | 0 | 1 | 1 | | | | | | | 0 | 0 | 0 | 0 | 0 | 0 | 0 |
| | SRC1 & SRC2 | | | | | | 1 | 0 | 0 | 1 | 0 | 0 | | | | | | | 0 | 0 | 0 | 0 | 0 | 0 | 0 |
| (con't) | SRC1 ∧ SRC2 | | | | | | 1 | 0 | 0 | 1 | 0 | 1 | | | | | | | 0 | 0 | 0 | 0 | 0 | 0 | 0 |
| | div_c(SRC1,SRC2,DST) | | | | | | 0 | 1 | 1 | 1 | 0 | 1 | | | | | | | | | | 0 | 0 | 0 | 1 |
| | div_b(SRC1,SRC2,DST) | | | | | | 0 | 1 | 1 | 1 | 1 | 0 | | | | | | | | | | | | | |
| | div_a(SRC1,SRC2,DST) | | | | | | 0 | 1 | 1 | 1 | 1 | 1 | | | | | | | | | | | | | |
| two operand register-immediate instruction with condition code | [if cc] DST=DST + $DATA | 0 | 0 | 1 | 0 | 1 | 0 | 0 | 0 | 0 | 0 | 0 | most significant byte of (long)$DATA (#4) | | | | | | DST | | | CC | | |
| | [if cc] DST=DST - $DATA | | | | | | 0 | 0 | 0 | 0 | 0 | 1 | | | | | | | | | | | | | |
| | [if cc] DST=$DATA - DST | | | | | | 0 | 0 | 0 | 0 | 1 | 0 | | | | | | | | | | | | | |
| | [if cc] DST=DST + $DATA + carry | | | | | | 0 | 0 | 0 | 0 | 1 | 1 | | | | | | | | | | | | | |
| | [if cc] DST=DST - $DATA - carry | | | | | | 0 | 0 | 0 | 1 | 0 | 0 | | | | | | | | | | | | | |
| | [if cc] DST=$DATA - DST - carry | | | | | | 0 | 0 | 0 | 1 | 0 | 1 | | | | | | | | | | | | | |
| | [if cc] DST.i=DST.i + $DATA | | | | | | 0 | 0 | 1 | 1 | 0 | 0 | | | | | | | | | | | | | |
| | [if cc] DST.i=DST.i - $DATA | | | | | | 0 | 0 | 1 | 1 | 0 | 1 | | | | | | | | | | | | | |
| | [if cc] DST.i=$DATA - DST.i | | | | | | 0 | 0 | 1 | 1 | 1 | 0 | | | | | | | | | | | | | |
| | DST.i - $DATA | | | | | | 0 | 1 | 0 | 1 | 0 | 0 | | | | | | | | | | | | | |
| | [if cc] DST=DST & $DATA | | | | | | 0 | 1 | 1 | 0 | 0 | 1 | | | | | | | | | | | | | |
| | [if cc] DST=DST ∨ $DATA | | | | | | 0 | 1 | 1 | 0 | 1 | 0 | | | | | | | | | | | | | |
| | [if cc] DST=DST ∧ $DATA | | | | | | 0 | 1 | 1 | 0 | 1 | 1 | | | | | | | | | | | | | |
| long DATA | [if cc] Rn=$DATA (#9) | 0 | 0 | 1 | 1 | 0 | 0 | 1 | | | | | most significant byte of (long)$DATA | | | | | | Rn (64 kinds of registers) | | | CC | | |

(#4) least significant 2 bytes are specified in the second data word
(#9) when the ccr is specified as a destination with [if cc], all contents in ccr are updated

Figure 3(g)

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1157 direct shift instruction with CC | [if cc] DST=DST <<l $Data | 0 | 0 | 0 | 0 | 0 | 0 | 0 | 0 | 0 | 0 | \multicolumn{4}{c}{-24<=$Data<=+24} | | | | \multicolumn{3}{c}{DST} | \multicolumn{4}{c}{CC} |
| | [if cc] DST=DST <<a $Data    (#2) | 0 | 0 | 0 | 0 | 0 | 0 | 0 | 0 | 0 | 1 | \multicolumn{4}{c}{-8<=$Data<=+48} | | | | | | | | | | |
| | [if cc] DST=DST <<r $Data | 0 | 0 | 0 | 0 | 0 | 0 | 0 | 0 | 1 | 0 | \multicolumn{4}{c}{-1<=$Data<=+1} | | | | | | | | | | |
| | [if cc] DST=DST <<rc $Data | 0 | 0 | 0 | 0 | 0 | 0 | 0 | 0 | 1 | 1 | | | | | | | | | | | | | | |
| 1161 direct bit manip. instruction with CC | [if cc] DST=bit_clear(DST,$Data) | 0 | 0 | 0 | 0 | 0 | 0 | 0 | 1 | 0 | 0 | 0 | 0 | \multicolumn{4}{c}{$Data} | | \multicolumn{3}{c}{} | \multicolumn{4}{c}{} |
| | [if cc] DST=bit_set(DST,$Data) | | | | | | | | | | | 0 | 1 | | | | | | | | | | | | |
| | [if cc] DST=bit_comp(DST,$Data) | | | | | | | | | | | 1 | 0 | | | | | | | | | | | | |
| | [if cc] DST=bit_test(DST,$Data) | | | | | | | | | | | 1 | 1 | | | | | | | | | | | | |
| 1146 six operand register-register instruction | D1=SX1+SY1 | 0 | 1 | \multicolumn{2}{c}{SRCX1} | | | \multicolumn{2}{c}{SRCY1} | | | \multicolumn{2}{c}{DST1} | | | \multicolumn{2}{c}{SRCX2} | | \multicolumn{2}{c}{SRCY2} | | \multicolumn{2}{c}{DST2} | 0 | 0 | 0 | 0 |
| | D2.u=SX2.s * SY2.s | | | | | | | | | | | 0:a0 | | | | 0:a0 | | 0:a0 | 0:a0 | | | | | | |
| | D1=SX1 - SY1 | | | | | | | | | | | 1:a1 | | | | 1:a1 | | 1:a1 | 1:a1 | | | 0 | 0 | 0 | 1 |
| | D2.u=SX2.s * SY2.s | | | | | | | | | | | 2:mo | | | | 2:mo | | 2:mo | 2:mo | | | | | | |
| | D1=SX1 + SY1 | | | | | | | | | | | 3:m1 | | | | 3:m1 | | 3:m1 | 3:m1 | | | 0 | 0 | 1 | 0 |
| | D2.u=SX2.us * SY2.s | | | | | | | | | | | 4:xd0 | | | | 4:xd0 | | 4:xd0 | 4:xd0 | | | | | | |
| | D1=SX1 - SY1 | | | | | | | | | | | 5:xd1 | | | | 5:xd1 | | 5:xd1 | 5:xd1 | | | 0 | 0 | 1 | 1 |
| | D2.u=SX2.us * SY2.s | | | | | | | | | | | 6:yd0 | | | | 6:yd0 | | 6:yd0 | 6:yd0 | | | | | | |
| | D1=SX1 + SY1 | | | | | | | | | | | 7:yd1 | | | | 7:yd1 | | 7:yd1 | 7:yd1 | | | 0 | 1 | 0 | 0 |
| | D2.u=SX2.us * SY2.us | | | | | | | | | | | | | | | | | | | | | | | | |
| | D1=SX1 - SX2       (#3) | | | | | | | | | | | | | | | | | | | | | 0 | 1 | 0 | 1 |
| | D2.u=SX2.us * SY2.us | | | | | | | | | | | | | | | | | | | | | | | | |
| | D1=SX1 + SY1 + carry | | | | | | | | | | | | | | | | | | | | | 0 | 1 | 1 | 0 |
| | D2.u=SX2.s * SY2.s | | | | | | | | | | | | | | | | | | | | | | | | |
| | D1=SX1 - SY1 - carry | | | | | | | | | | | | | | | | | | | | | 0 | 1 | 1 | 1 |
| | D2.u=SX2.s * SY2.s | | | | | | | | | | | | | | | | | | | | | | | | |

Figure 3(h)

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| six operand register-register instruction (1146) | D1=SX1+SY1<br>D2.u=SX2.s * SY2.s | 0 | 1 | SRCX1 | | | SRCY1 | | | DST1 | | | SRCX2 | | | SRCY2 | | | DST2 | | | 1 | 0 | 0 | 0 |
| | D1=SX1-SY1<br>D2.u=SX2.s * SY2.s | | | | | | | | | | | | | | | | | | | | | 1 | 0 | 0 | 1 |
| | D1=SX1+SY1<br>D2.u=SX2.us * SY2.s | | | | | | | | | | | | | | | | | | | | | 1 | 0 | 1 | 0 |
| (con't) | D1=SX1-SY1<br>D2.u=SX2.us * SY2.s | | | | | | | | | | | | | | | | | | | | | 1 | 0 | 1 | 1 |
| | D1=SX1+SY1<br>D2.u=SX2.us * SY2.us | | | | | | | | | | | | | | | | | | | | | 1 | 1 | 0 | 0 |
| | D1=SX1-SX2<br>D2.u=SX2.us * SY2.us (#3) | | | | | | | | | | | | | | | | | | | | | 1 | 1 | 0 | 1 |
| | D1=SX1+SY1 + carry<br>D2.u=SX2.s * SY2.s | | | | | | | | | | | | | | | | | | | | | 1 | 1 | 1 | 0 |
| | D1=SX1-SY1 - carry<br>D2.u=SX2.s * SY2.s | | | | | | | | | | | | | | | | | | | | | 1 | 1 | 1 | 1 |
| double ld/st (1147) | Raa=MEMA Rbb=MEMB (#10)<br>MEMA=RAA Rbb=MEMB | 0 | 0 | 1 | 0 | 0 | MEMB load | | | Aq (=An) | | | MEMA load / MEMA store | | | Raa<br>a0h~1h<br>xd0h~1h | | | Rbb<br>m0h~1h<br>yd0h~1h | | | Ap (=An) | | | 0<br>1 |
| single ld/st (1165) | Rn=MEM (#10)<br>MEM=Rn | 0 | 0 | 0 | 0 | 0 | 0 | 0 | 0 | 0 | 0 | 0 | MEM load / MEM store | | | Rn<br>64 kinds of regsiters | | | | | | An | | | 0<br>1 |
| (1156) | [Rn=*]An++Disp (#11)<br>*An++Disp=Rn | 0 | 0 | 0 | 0 | 0 | 0 | 0 | 0 | 0 | 0 | 1 | $Disp | | | | | | | | | | | | 0<br>1 |

(#10) "An++i0,1" instructions are released in '"MEM=Rn" and "'MEMA=Raa, MEMB=Rbb"
(#11) in case of omitting [Rn=*] part, data load operation is not executed; just address regsister update operation only and dummy regsister code is used not to update any destinations.

Figure 3(i)

| | Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|
| 1160 | single ld/st | Rn=*$Address | 0 | 0 | 0 | 0 | 0 | 0 | 0 | 1 | 1 | 0 | 0 | 0 | 0 | 0 | Rn (64 kinds of regsiters) | | | | | | 0 | 0 | (long) $Add (upper) (#4) |
| | | *$Address=Rn | | | | | | | | | | 1 | | | | | | | | | | | | | | (short)$Address | |
| 1155 | | Rn=*(short)Address (#8) | 0 | 0 | 0 | 0 | 1 | 0 | | | (short)$Address | | | | | | | | | | | | | 0 | 0 | 0 | 0 |
| | | *(short)Address=Rn | | | | | 1 | | | | | | | | | | | | | | | | | | | | |
| 1166 | stacking | pop Rn | 0 | 0 | 0 | 0 | 0 | 0 | 0 | 0 | 0 | 0 | 0 | 1 | 0 | 0 | | | | | | | | | | |
| | | push Rn | | | | | | | | | | | | | 1 | | | | | | | | | | | | |
| 1164 | special | set | 0 | 0 | 0 | 0 | 0 | 0 | 0 | 0 | 0 | 1 | 0 | 0 | 0 | 0 | 0 | 0 | 0 | 0 | mode definition area | | | | | | |
| | | [if cc] break | | | | | | | | | | | | 0 | 0 | 0 | 0 | 1 | 0 | 0 | 1 | 1 | CC | | | | |
| | | [if cc] trap N | | | | | | | | | | | | 0 | 0 | 0 | 0 | 1 | 0 | 0 | 0 | N | | | | | |
| | | [if cc] creturn | | | | | | | | | | | | 0 | 0 | 0 | 1 | 0 | 1 | 0 | 0 | 0 | 0 | | | | |
| | | [if cc] ireturn | | | | | | | | | | | | 0 | 0 | 0 | 1 | 0 | 1 | 0 | 0 | 0 | 0 | | | | |
| | | [if cc].breturn | | | | | | | | | | | | 0 | 0 | 0 | 1 | 1 | 1 | 0 | 0 | 0 | 0 | | | | |
| 1168 | | second word of 2 word instruction | 0 | 0 | 0 | 0 | 0 | 0 | 0 | 1 | 1 | 1 | 1 | 1 | 1 | 1 | 1 | 1 | least significant 2 bytes of $Address or $Data | | | | | | | | |
| 1170 | | nop | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1154 | direct repeat | repeat M rc=N | 0 | 0 | 0 | 1 | 1 | 0 | 0 | 0 | 0 | 0 | 0 | 0 | 0 | 0 | 0 | N | | | | | | | | | |
| 1167 | indirect repeat | repeat M rc=Rm | 0 | 0 | 0 | 1 | 0 | 0 | 0 | 0 | 0 | 0 | 0 | 1 | 1 | 1 | 1 | Rm | | | | | | | | | |

(#8) in case of short direct addressing, constant offset value (H'8000) is always added to short direct address specified by this instruction code

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| indirect standard branch with condition code (1168) | [if cc] goto Rm | 0 | 0 | 0 | 0 | 0 | 0 | 0 | 0 | 0 | 0 | 0 | 0 | 1 | 0 | 0 | 0 | Rm a0h~1h m0h~1h xd0h~1h yd0h~1h xa0~3 ya0~3 | | | | CC | | | |
|  | [if cc] loop Rm |  |  |  |  |  |  |  |  |  |  |  |  |  | 0 | 0 | 1 |  |  |  |  |  |  |  |  |
|  | [if cc] call Rm |  |  |  |  |  |  |  |  |  |  |  |  |  | 0 | 1 | 0 |  |  |  |  |  |  |  |  |
|  | [if cc] breakout Rm |  |  |  |  |  |  |  |  |  |  |  |  |  | 0 | 1 | 1 |  |  |  |  |  |  |  |  |
|  | [if cc] rgoto Rm |  |  |  |  |  |  |  |  |  |  |  |  |  | 1 | 0 | 0 |  |  |  |  |  |  |  |  |
|  | [if cc] rloop Rm |  |  |  |  |  |  |  |  |  |  |  |  |  | 1 | 0 | 1 |  |  |  |  |  |  |  |  |
|  | [if cc] rcall Rm |  |  |  |  |  |  |  |  |  |  |  |  |  | 1 | 1 | 0 |  |  |  |  |  |  |  |  |
|  | [if cc] rbreakout Rm |  |  |  |  |  |  |  |  |  |  |  |  |  | 1 | 1 | 1 |  |  |  |  |  |  |  |  |
| direct standard branch with condition code (1152) | [if cc] goto (short)$Address | 0 | 0 | 0 | 1 | 0 | 0 | 0 | 0 | (short)$Address for direct branch | | | | | | | | | | | | CC | | | |
|  | [if cc] loop (short)$Address |  |  |  |  | 0 | 0 | 1 |  |  |  |  |  |  |  |  |  |  |  |  |  |  |  |  |  |
|  | [if cc] call (short)$Address |  |  |  |  | 0 | 1 | 0 |  |  |  |  |  |  |  |  |  |  |  |  |  |  |  |  |  |
|  | [if cc] breakout (short)$Address (#4) |  |  |  |  | 0 | 1 | 1 |  |  |  |  |  |  |  |  |  |  |  |  |  |  |  |  |  |
|  | [if cc] rgoto $Disp |  |  |  |  | 1 | 0 | 0 | $Disp for PC relative branch | | | | | | | | | | | | | | | | |
|  | [if cc] rloop $Disp |  |  |  |  | 1 | 0 | 1 |  |  |  |  |  |  |  |  |  |  |  |  |  |  |  |  |  |
|  | [if cc] rcall $Disp |  |  |  |  | 1 | 1 | 0 |  |  |  |  |  |  |  |  |  |  |  |  |  |  |  |  |  |
|  | [if cc] rbreakout $Disp |  |  |  |  | 1 | 1 | 1 |  |  |  |  |  |  |  |  |  |  |  |  |  |  |  |  |  |
| (1162) | [if cc] goto $Address | 0 | 0 | 0 | 0 | 0 | 0 | 0 | 0 | 1 | 0 | 0 | 0 | 0 | 0 | 0 | 0 | 0 | 0 | (long) $Add (upper) (#4) | | | CC | | | |
|  | [if cc] loop $Address |  |  |  |  |  |  |  |  |  |  | 0 | 1 |  |  |  |  |  |  |  |  |  |  |  |  |
|  | [if cc] call $Address |  |  |  |  |  |  |  |  |  |  | 1 | 0 |  |  |  |  |  |  |  |  |  |  |  |  |
|  | [if cc] breakout $Address |  |  |  |  |  |  |  |  |  |  | 1 | 1 |  |  |  |  |  |  |  |  |  |  |  |  |
| indirect delayed branch with CC (1169) | [if cc] dgoto Rm | 0 | 0 | 0 | 0 | 0 | 0 | 0 | 0 | 0 | 0 | 0 | 0 | 0 | 1 | 0 | 0 | Rm | | | | CC | | | |
|  | [if cc] dloop Rm |  |  |  |  |  |  |  |  |  |  |  |  |  |  | 0 | 1 |  |  |  |  |  |  |  |  |
|  | [if cc] drgoto Rm |  |  |  |  |  |  |  |  |  |  |  |  |  |  | 1 | 0 |  |  |  |  |  |  |  |  |
|  | [if cc] drloop Rm |  |  |  |  |  |  |  |  |  |  |  |  |  |  | 1 | 1 |  |  |  |  |  |  |  |  |
| direct delayed branch with CC (1153) | [if cc] dgoto (short)$Address | 0 | 0 | 0 | 1 | 1 | 0 | 0 | 0 | (short)$Address for direct branch | | | | | | | | | | | | CC | | | |
|  | [if cc] dloop (short)$Address |  |  |  |  |  | 0 | 1 |  |  |  |  |  |  |  |  |  |  |  |  |  |  |  |  |  |
|  | [if cc] drgoto $Disp |  |  |  |  |  | 1 | 0 | $Disp for PC relative branch | | | | | | | | | | | | | | | | |
|  | [if cc] drloop $Disp |  |  |  |  |  | 1 | 1 |  |  |  |  |  |  |  |  |  |  |  |  |  |  |  |  |  |
| (1163) | [if cc] dgoto $Address (#4) | 0 | 0 | 0 | 0 | 0 | 0 | 0 | 0 | 0 | 0 | 1 | 0 | 0 | 0 | 0 | 0 | 0 | 0 | $Add (upper) | | | CC | | | |
|  | [if cc] dloop $Address |  |  |  |  |  |  |  |  |  |  |  | 1 |  |  |  |  |  |  |  |  |  |  |  |  |

DATA PROCESSOR WITH CONTROL LOGIC FOR STORING OPERATION MODE STATUS AND ASSOCIATED METHOD

CROSS-REFERENCE TO RELATED APPLICATIONS

The following applications, which are assigned to the same assignee as the instant application, have been filed on the same date as the instant application and contain related subject matter. They are incorporated herein by reference.

Digital Signal Processor and Method for Executing DSP and RISC Class Instruction Defining Identical Data Processing or Data Transfer Operations, Kiuchi et al., Ser. No. 08/127,694

Digital Signal Processor and Method for Executing an Instruction with Variable Length Type Code, Baji et al., Ser. No. 08/127,938

Digital Signal Processor and Associated Method for Conditional Data Operation with No Condition Code, Update, Kiuchi et al., Ser. No. 08/127,691

On Chip DMA Controller with Interrupt Functions for Digital Signal Processor, Bail, Ser. No. 08/127,685

Double Precision Division Circuit and Method for Digital Signal Processor, Nakagawa et al., Ser. No. 08/127,660

On-Chip DMA Controller with Host Computer Interface, Baji et al., Ser. No. 08/127,429

Digital Signal Processor with No-Chip Address Decoder and Wait Status Controller, Baji, Ser. No. 08/127,682

Modulo Arithmetic Addressing Circuit, Shridhar et al., Ser. No. 08/127,431

The present invention relates generally to data processors including digital signal processors (DSPs) and microprocessors. More particularly, it pertains to a data processor that has logic for storing during the handling of break and standard interrupt requests the operation mode the data processor was in just prior to the handling of the break interrupt request.

BACKGROUND OF THE INVENTION

Most conventional data processors, including digital signal processors (DSPs) and microprocessors, have several modes of operation. These include a run mode and power saving mode.

Furthermore, some conventional data processors have specialized features for performing an emulation function. The emulation function enables the data processor to be used in conjunction with an in-circuit emulator (ICE) system for developing software to be programmed in the data processor and for developing hardware to be used with the data processor. The emulation function may be enabled or initialized when the in-circuit emulator (ICE) system issues a break interrupt.

However, these conventional data processors do not have logic for storing the mode of operation that the data processor was in just prior to the handling of a break or standard interrupt request. As a result, if the data processor was in a power saving mode just before the receipt of a break interrupt request, it cannot be returned directly to the power saving mode upon completion of handling the interrupt request.

SUMMARY OF THE INVENTION

The present invention is a data processor that includes an interrupt controller, a condition code register, a condition code register controller, a condition code stacking register, a data memory with a stacking area, a data processing unit, and an interrupt request decoder. The interrupt controller receives interrupt request signals including a break interrupt request signal and a plurality of standard interrupt request signals. The condition code register stores condition code values including a data processor mode control value. The data processing unit performs data processing operations. The data processing operations are suspended when the data processor mode control value is set to a predefined "sleep mode" or "software standby mode" value and are enabled when the data processor mode control value is set to a predefined "run mode".

The interrupt decoder responds to a received break interrupt request signal by generating: (A) first, condition code register control signals to copy the mode control value stored in the condition code register into the condition code stacking register, (B) second, condition code register control signals to set the mode control value to the predefined "run mode" value. The mode control value stored in the condition code register is copied to the condition code stacking register in response to the condition code register control signals, and the data stacking area in accordance with the condition code register control signals. Then the condition code controller sets the data processor mode control value to the "run mode" value for copying the mode control value to the condition code stacking register and the data stacking area in accordance with the condition code register control signals.

The interrupt decoder responds to a standard interrupt request signal by generating: (A) first, condition code register control signals to set the mode control value to the predefined "run mode" value; and (B), second, condition code register control signals to copy the mode control value stored in the condition code register into the data stacking area. The condition code controller sets the data processor mode control value to one of a "run mode" value, and a "sleep mode" value, for copying the mode control value to one of the condition code stacking register and said data stacking area in accordance with the condition code register control signals.

BRIEF DESCRIPTION OF THE DRAWINGS

Additional objects and features of the invention will be more readily apparent from the following detailed description and appended claims when taken in conjunction with the drawings and tables, in which:

FIGS. 3(a)–(k) list the specific instructions of the instruction set of the DSP of the present invention;

DESCRIPTION OF THE PREFERRED EMBODIMENT

FIGS. 1-12 provide illustrations of the invention disclosed herein. In these figures, like components are designated by like numerals.

Figure 1:
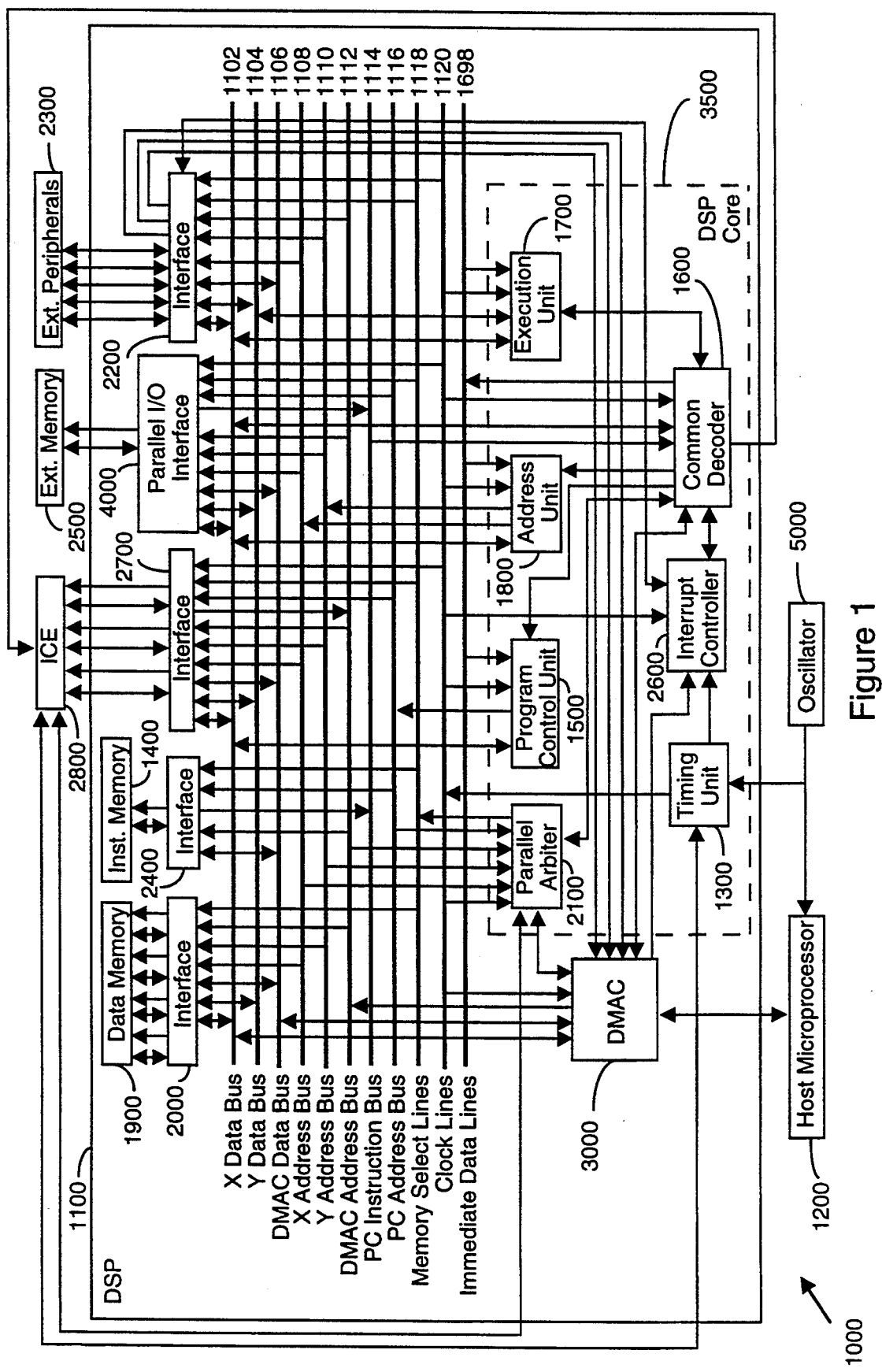
FIG. 1 is a block diagram of a data processing system in accordance with the present invention including a digital signal processor, a host microprocessor, and an in-circuit emulation (ICE) system.

Referring initially to FIG. 1, there is shown a data processing system 1000. The data processing system 1000 includes a digital signal processor (DSP) 1100, a host microprocessor 1200, an oscillator 5000, an in-circuit emulation (ICE) system 2800, external peripheral devices 2300, and an external memory 2500. The DSP 1100 has a Harvard architecture in that it includes an instruction bus 1114 which is separate from the X data bus 1102 and the Y data bus 1104.

INSTRUCTION SET

Figure 2A:
FIGS. 2(a) and 2(b) lists the instruction classes and the instruction types for the instruction set of the DSP of the present invention.
Figure 2B:

FIGS. 2(a) and 2(b) shows a listing of the classes and types of instructions included in the instruction set of DSP 1100. The instructions are divided into classes labeled 1130 and 1132 and into instruction types labeled 1134-1170. Furthermore, FIGS. 3(a)-(k) show how the instruction types 1134-1170 are further subdivided into specific instructions. FIGS. 2(a)-2(b) also shows the various kinds of fields included in the different types of instructions.

The instruction set includes DSP class instructions 1130. As is evident from the instruction type column of FIG. 2(a), the DSP class 1130 instructions include (a) instruction types 1134 and 1135 that define parallel data processing operations in parallel with parallel data transfer operations, (b) instruction types 1136, 1137, 1140 and 1141 that define single data processing operations in parallel with parallel data transfer operations, (c) instruction types 1138 and 1139 that define parallel data processing operations in parallel with single data transfer operations, (d) instruction types 1142-1145 that define single data processing operations in parallel with single data transfer operations.

Furthermore, the instruction set includes RISC class instructions 1132, as shown in FIG. 2(b). The RISC class instructions 1132 include (a) instructions types 1152-1154, 1162, 1163, and 1167-1169 that define program control operations, (b) instruction types 1149, 1151, 1157, 1159, and 1161 that define single data processing operations exclusively (i.e., not in parallel with data processing operations), (c) an instruction type 1146 that defines parallel data processing operations exclusively (i.e., not in parallel with data processing operations), (d) instruction types 1148, 1150, 1155, 1157, 1160, 1165, and 1166 that define single data transfer operations exclusively (i.e., not in parallel with data transfer operations), (e) an instruction type 1147 that defines parallel data transfer operations exclusively (i.e., not in parallel with data transfer operations), (f) an instruction type 1158 that defines the second word of a double word instruction, (g) an instruction type 1164 that defines special operations, and (h) an instruction type 1170 for no operations (NOPs).

As shown in FIG. 3(j), the special instruction type 1164 may define a number of special instructions. These include (a) a mode or flag set instruction (set), (b) a break interrupt instruction (break), (c) a trap interrupt instruction (trap), (d) a subroutine return instruction (return), (e) a normal interrupt return instruction (ireturn), and (e) a break interrupt return instruction (breturn).

Both the DSP class and the RISC class instructions 1130 and 1132 have a fixed bit length. In the preferred embodiment, each instruction includes 24 bits. However, in other embodiments, these fixed bit length instructions may have other fixed bit lengths including 16 and 32 bits.

OPERATIONAL MODES OF DSP

In general, the DSP 1100 has four main modes of operation. These include a run mode, a sleep mode, a software standby mode, and a break mode in which the run, sleep, and software modes can also be used. The sleep and software standby modes are power saving modes so that the DSP 1100 does not expend unnecessary amounts of energy.

Run Mode

Figure 7:
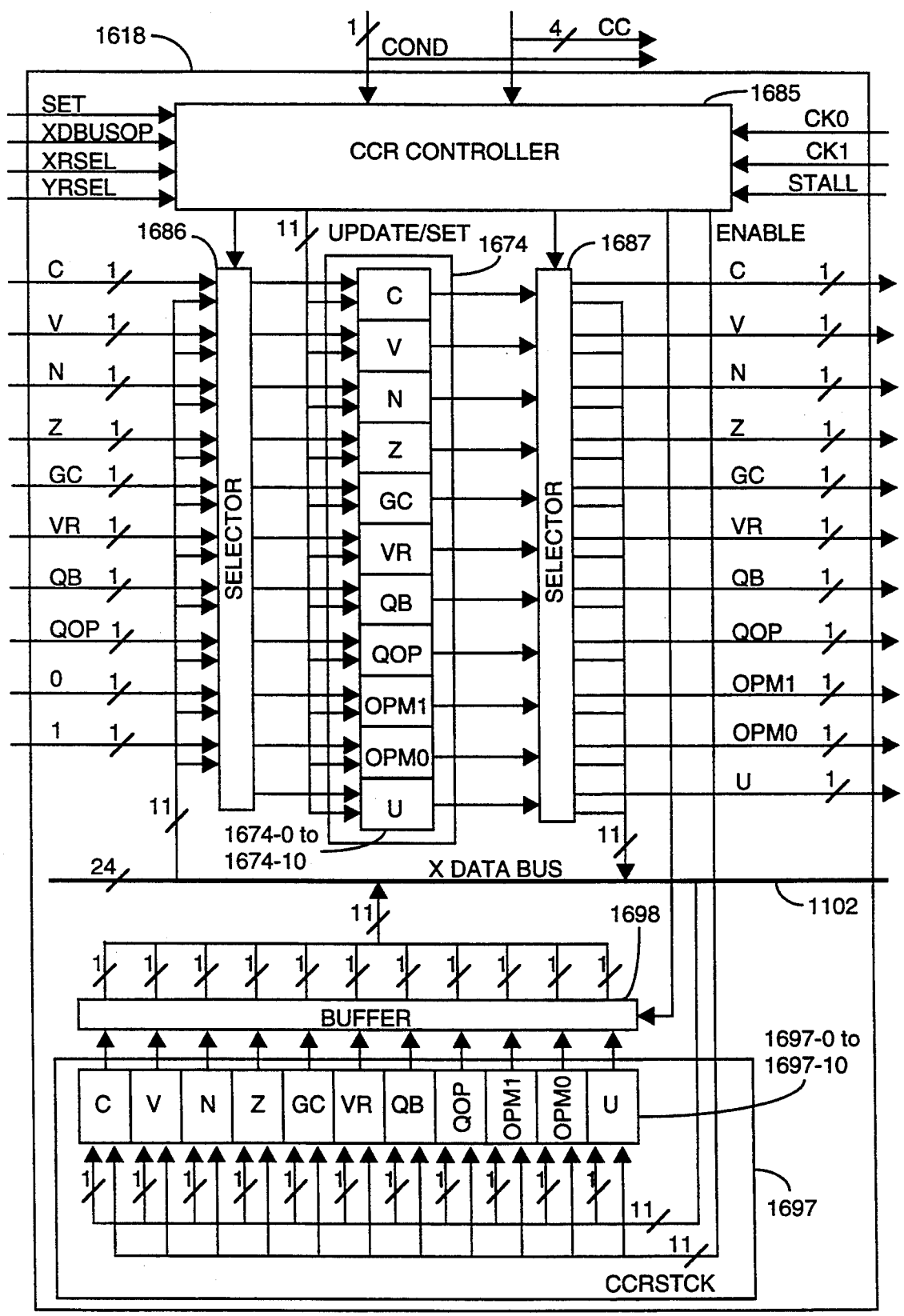
FIG. 7 is a block diagram of the register block of the common decoder unit.

Referring to FIG. 7, as will be described later in detail, the run mode is activated by (a) an instruction, (b) a host command, or (c) an interrupt which sets the operation mode status bits OPM1 and OPM0 stored in the bit registers 1674-8 and 1674-9 of the condition code register 1674 (ccr) so that they indicate the run mode. In the preferred embodiment, the run mode is designated by setting the first and second operation mode bits OPM1 and OPM0 stored by the bit registers 1674-1 and 1674-2 low.

Figure 6A:
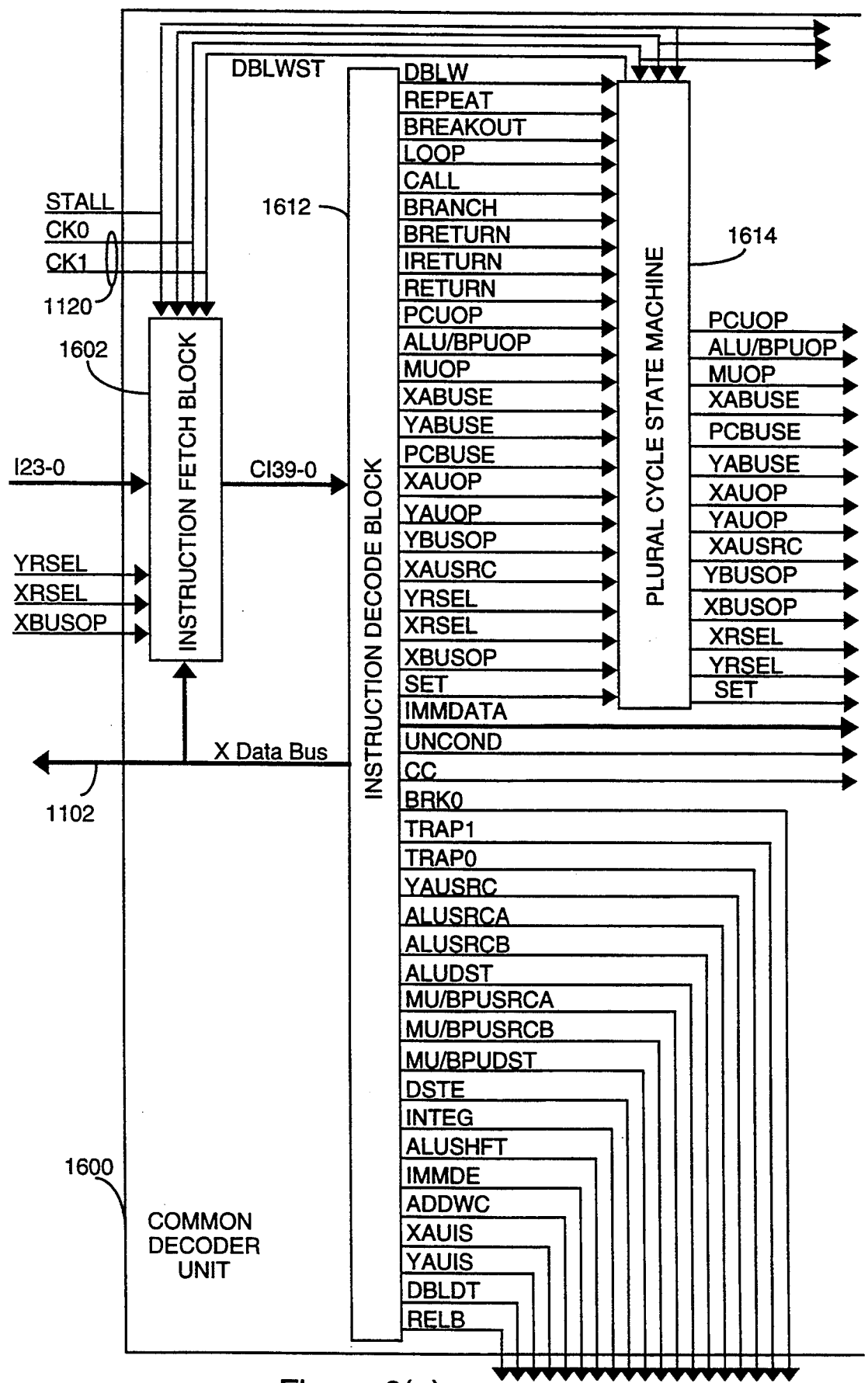
FIGS. 6(a)-(c) are a block diagram of the common decoder unit of the DSP of the present invention.
Figure 6B:
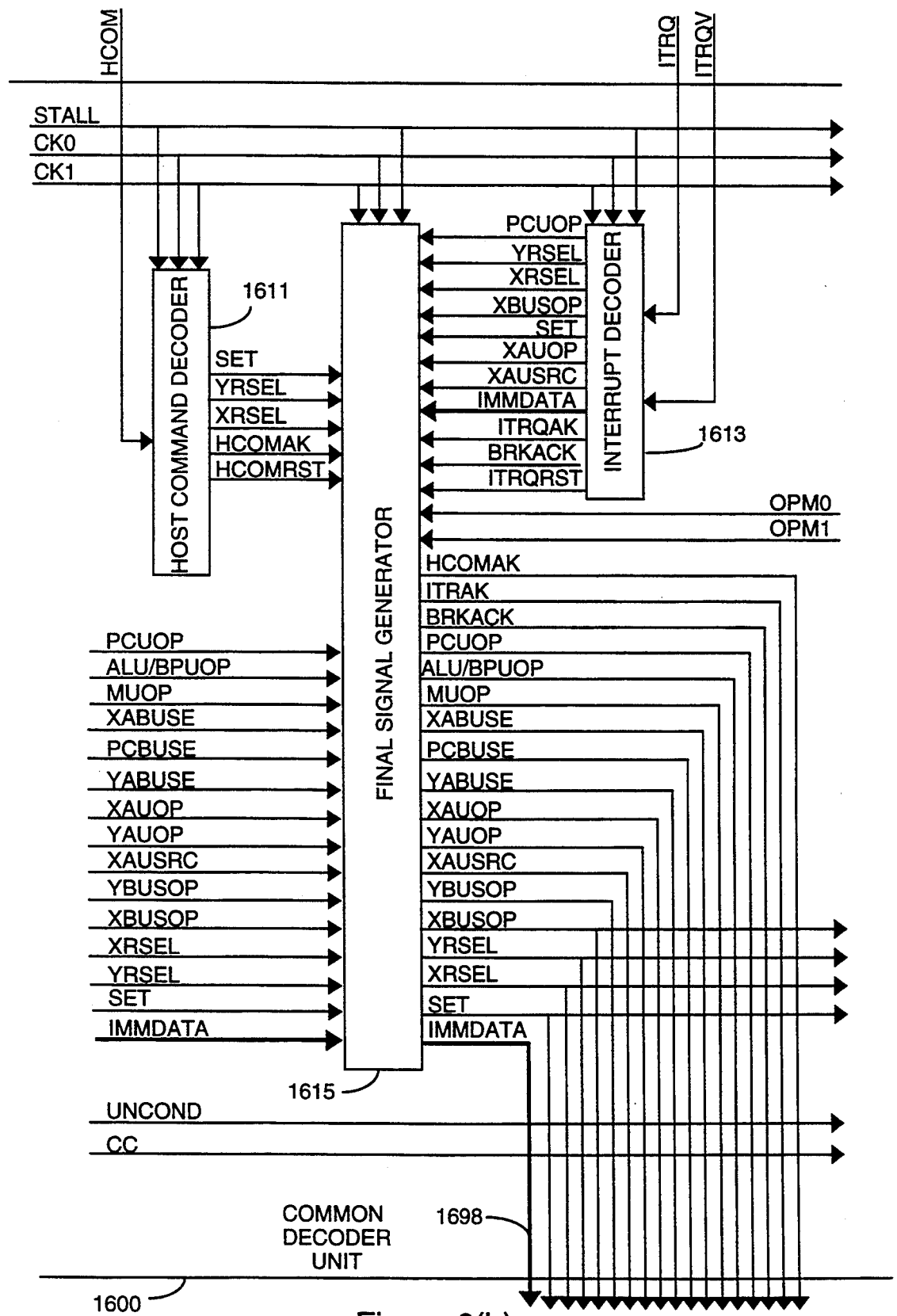

The bit registers 1674-8 and 1674-9 of the condition code register 1674 (ccr) output the operation mode bits OPM1 and OPM0 they store to the final signal generator 1615 of the common decoder unit 1600 as shown in FIGS. 6(b) and (c). In response, referring to FIG. 6(a) as well, the final signal generator 1615 does not modify any of the control signals received from the instruction decode block 1612 or the plural cycle state machine 1614, as will be explained more fully later.

In the run mode, the operation of the DSP 1100 involves a three stage pipeline for fetching, decoding, and executing the instructions shown in FIGS. 3(a)-(k). These stages are an instruction fetch stage, a decoding stage, and an execution stage.

Figure 4:
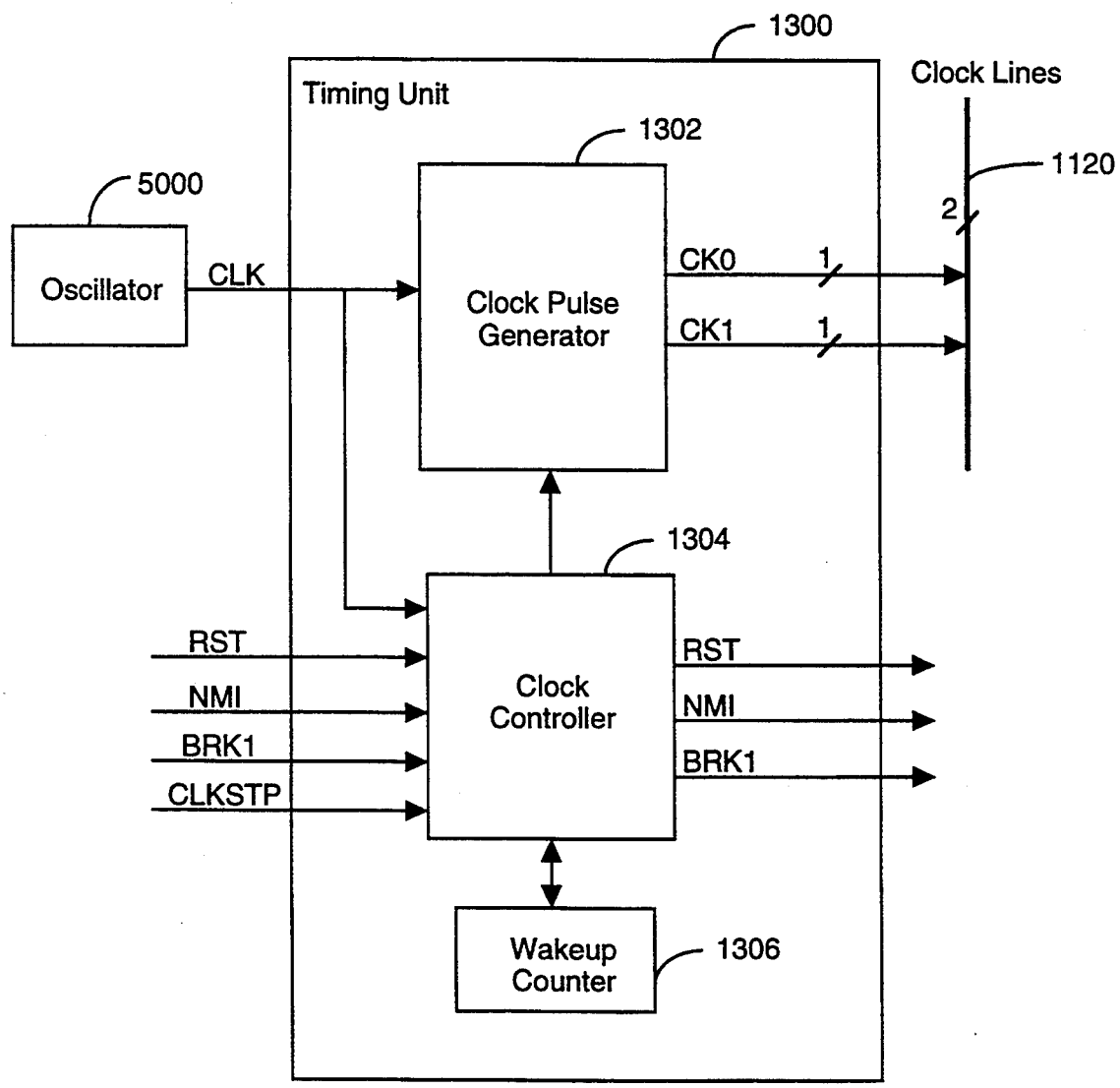
FIG. 4 is a block diagram of the timing unit and clock pulse generator of the DSP of the present invention.

Referring to FIG. 1, the DSP 1100 includes a timing unit 1300 which provides the basic timing for the operation of the DSP 1100. As shown in FIGS. 4, the timing unit 1300 includes a clock pulse generator 1302 and a clock controller 1304. As will be described later in detail, in the run mode, the clock controller receives a flow level CLKSTP signal that indicates the operation of the clock pulse generator should not be stopped. As a result, the clock controller 1304 outputs a control signal to the clock pulse generator 1302 so that it continues to output the clock signals CK0 and CK1. Referring back to FIG. 1, the clock signals are provided over the clock lines 1120 to the other elements of the DSP 1100 for implementing the three stage pipeline.

Figure 5:
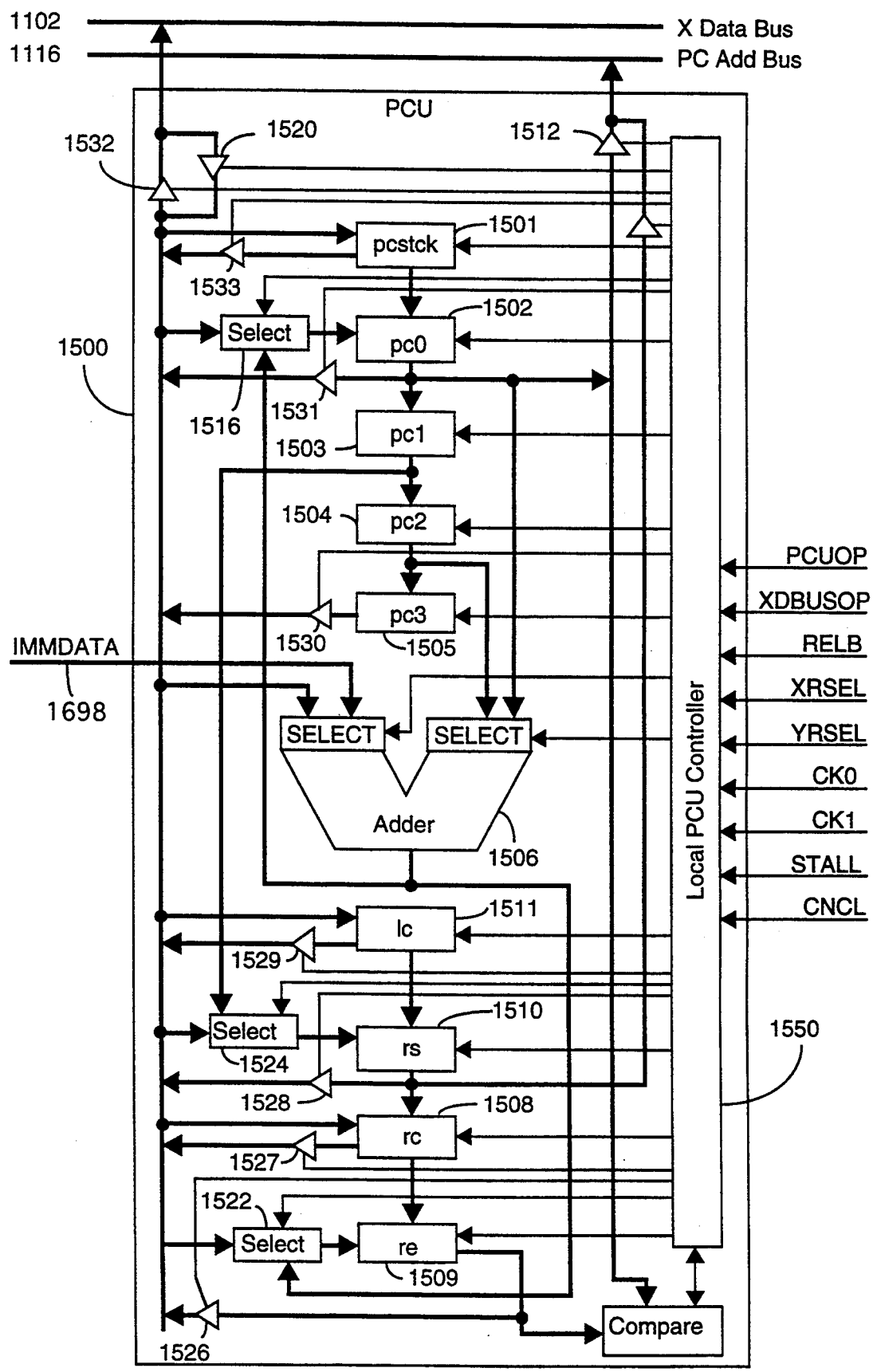
FIG. 5 is a block diagram of the program control unit of the DSP of the present invention.

Turning to FIG. 5, the program control unit (PCU) 1500 includes a program control register 1502 (pc0), a buffer 1512, and a local program control (PCU) controller 1550. During the run mode, the local PCU controller 1550 receives the clock signals CK0 and CK1 from the timing unit 1300. In response, the local PCU controller 1550 generates a control signal for controlling the buffer 1512 to output an address ($A_{17}$-$A_0$) stored by the first program control register 1502 (pc0) onto the PC address bus 1116. Referring to FIG. 1, this address may be located in the instruction memory 1400, the external memory 1900, or, the virtual instruction memory 2804 of the in-circuit emulation (ICE) system 2800 shown in FIG. 11. The virtual instruction memory 2804 is physically located off-chip and virtually expands the on-chip data memory 1900 of the DSP 1100.

Referring back to FIG. 5, the local PCU controller also generates control signals for (a) enabling the second program control register 1503 (pc1) to store the address that was just output and also stored by the first program control register 1502 (pc0) during the last machine cycle, (b) enabling the third program control register 1504 (pc2) to store the address that was just output and also stored by the second program control register 1503 (pc1) during the last machine cycle, and (c) enabling the fourth program control register 1505 (pc3) to store the address that was just output and also stored by the third program control register 1503 (pc2) during the last machine cycle. As will be evident later, this is done in order to keep track of addresses for subsequent program branching.

Referring to FIGS. 1 and 5, the address output by the first program control register 1502 (pc0) of the program control unit 1500 is received by the parallel arbiter 2100 from the PC address bus 1116. The parallel arbiter 2100 may also receive at the same time an address from the DMAC address bus 1112. The parallel arbiter 2100 decodes the addresses received and resolves any conflicts for accessing the instruction memory 1400, the external memory 1900, or the virtual instruction memory 2804 according to a predefined priority scheme. This priority scheme is as follows: (1) an address on the DMAC address bus 1112 held over from a previous arbitration is given first priority, (2) an address on the X address bus 1108 is given second priority, (3) an address on the Y address bus 1110 is given third priority, (4) an address on the PC address bus 1116 is given fourth priority, and (5) an address on the DMAC address bus 1112 not held over from a previous arbitration is given last priority.

As a result, the parallel arbiter 2100 eventually outputs select lines to one of the interfaces 2400, 4000, or 2700 for selecting the PC address bus 1116 at the appropriate time in order to access the instruction memory 1400, the external memory 1900, or the virtual instruction memory 2804 to fetch an instruction. In response, the instruction memory 1400, the external memory 1900, or the virtual instruction memory 2804 outputs an instruction on the program control (PC) instruction bus 1114. The common decoder unit 1600 receives the instruction from the PC instruction bus 1114.

Referring to 6(a)-(c), the instruction fetch block 1602 of the common decoder unit 1600 receives and stores the instruction provided on the PC instruction bus 1114. The instruction decode block 1 61 2 then decodes the instruction and generates a number of control signals.

Figure 8:
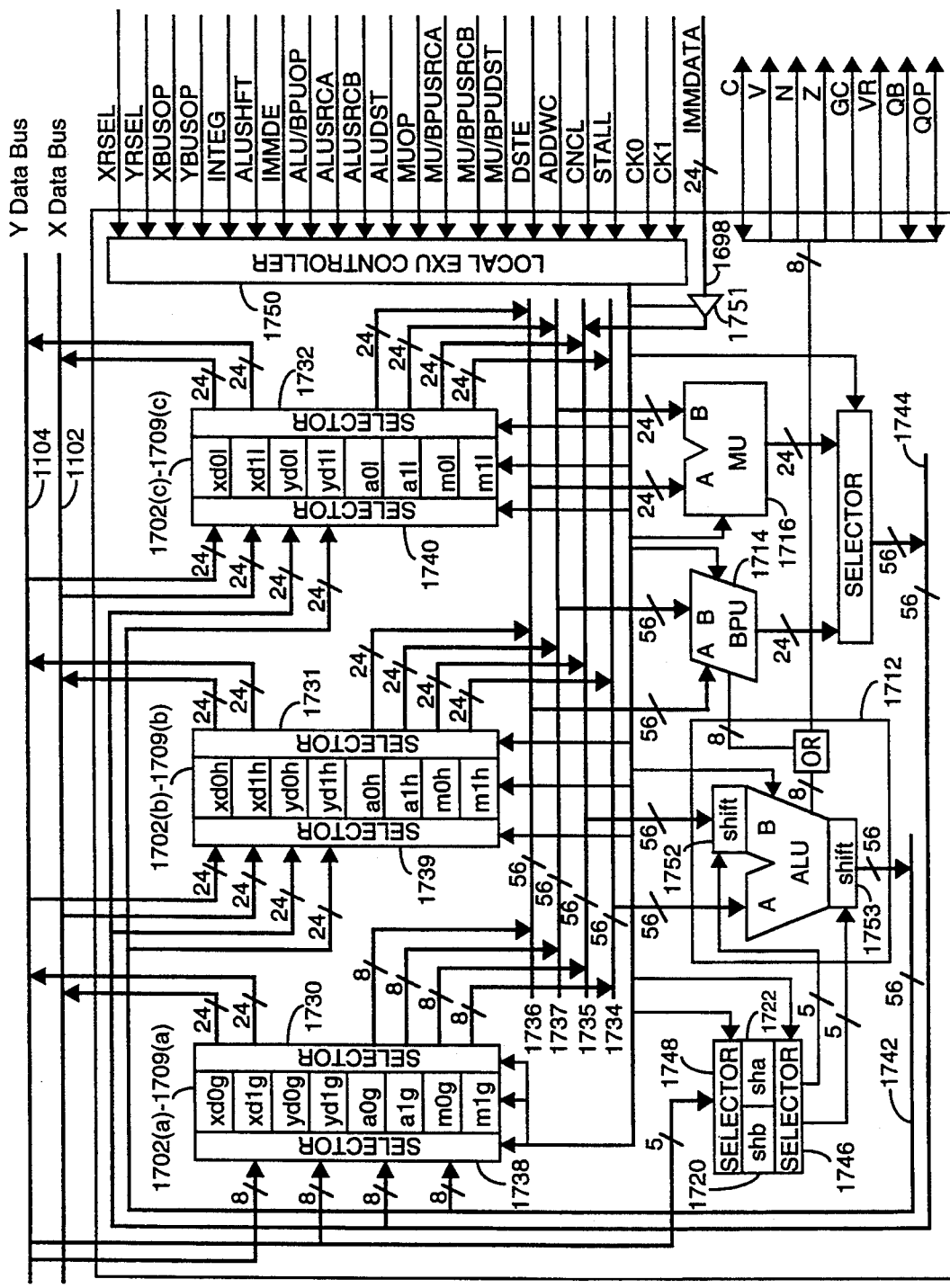
FIG. 8 is a block diagram of the execution unit of the DSP of the present invention.

Referring to FIGS. 6(a) and 8, the ALU/BPUOP signal is for controlling arithmetic logic unit (ALU) 1712 and the bit processing unit (BPU) 1714 to perform the ALU and BPU operations defined in FIGS. 3(a)-(i). The ALUSHFT signal is for controlling the ALU 1712 to perform shift functions for the operations defined by the ALU/BPUOP signal. The ADDWC signal is for controlling the ALU 1712 to perform an addition or a subtraction defined by the ALU/BPUOP signal with a carry or borrow. The IMMDE signal is for controlling the ALU 1712 to use as an operand source immediate data output by the immediate data decoder 1630 or data stored by the register designated by the ALUSRCB signal (discussed later) output by the ALU source and destination decoder 1634. The INTEG signal is for controlling the ALU 1712 to use integer or fraction arithmetic for the ALU operation defined by the ALU/BPUOP signal. The DSTE signal is for enabling or disabling the destination registers designated by the ALUDST signal from storing the result produced by the ALU 171 2 for an operation. The ALUSRCA, ALUSRCB, and ALUDST signals are for controlling the data register sets 1702-1710 of the execution unit (EXU) 1700 to act as sources or destinations for ALU operations defined by ALU/BPUOP signal.

The MUOP signal is for controlling the multiplier unit (MU) 1716 to perform the MU operations defined in FIGS. 3(a)-(i). The MU/BPUSRCA, MU/BPUSRCB, and MU/BPUDST signals are for controlling selected ones of the data register sets 1702-1710 of the execution unit (EXU) 1700 to act as sources or destinations for MU or BPU operations.

Figure 9:
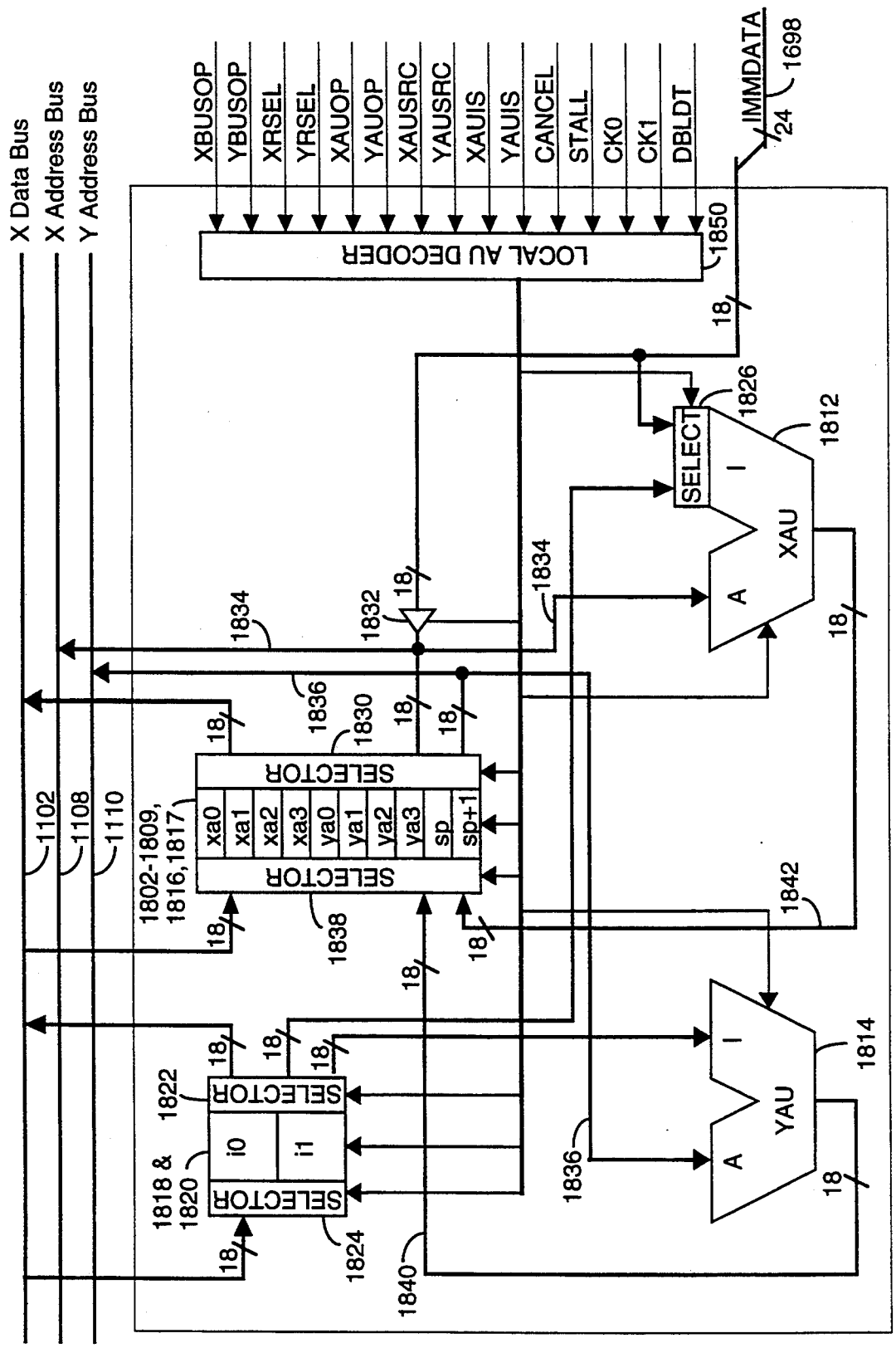
FIG. 9 is a block diagram of the address unit of the DSP of the present invention.

Referring to FIGS. 6(a) and 9, the XAUOP signal is for controlling the X address unit (XAU) 1812 to perform the address update operations defined in FIGS. 3(a)-(i). The YAUOP signal is for controlling the Y address unit (YAU) 1814 to perform the address update operations defined in FIGS. 3(a)-(i). The XAUIS signal is for selecting the source of the indexing operand used for various types of address updates defined by the XAUOP signal and performed by the X address unit 1812. The YAUIS signal is for selecting the source of the indexing operand used for various types of address updates defined by the XAUOP signal and performed by the Y address unit (YAU) 1814. The XABUSE signal and the YABUSE signal are used by the parallel arbiter 2100 for controlling access to the data memory unit 1900, the external memory 2500, the peripheral devices interfaces 2200, and the in-circuit emulation (ICE) system 2800. The DBLDT signal is for indicating to the address unit (AU) 1800 whether the decoded instruction involves one or two data transfers that require accessing data memory unit 1900.

Referring to FIGS. 6(a) and 5, the PCUOP signal is for controlling the program control unit (PCU) 1500 to perform the program control operations defined in FIGS. 3(a)-(i). The RELB signal is for controlling the program control unit (PCU) to perform the program control operations defined by the PCUOP signal with relative branching. The PCBUSE signal is for resolving conflicts in accessing the instruction memory unit 1400, the external memory 2500, or the in-circuit emulation (ICE) system 2800.

Referring to FIGS. 6(a), 6(b), 5, 8, and 9, the XDBUSOP signal is for controlling data transfers on the X data bus 1108. On the other hand, the YDBUSOP signal is for controlling data transfers on the Y data bus 1110. The XRSEL signal is for all data transfers using the X data bus 1102 including register to register (i.e., move) data transfers. The YRSEL signal is for memory access data transfers using the Y data bus 1104 and for register to register (i.e., move) data transfers using the X data bus.

Referring to FIGS. 6(a)-(c), 5, 8, and 9, the CC signal is simply the extracted condition code field (CC) of the decoded instruction. However, the UNCOND signal indicates either that the decoded instruction does or does not have a condition code field (CC). These signals are used by the condition code check block 1616 for generating the CNCL signal to cancel or not cancel in the execution stage the operations defined by the decoded instruction and being performed by the program control unit (PCU) 1500, the execution unit (EXU) 1700, or the address unit (AU) 1800. The CNCL signal indicates that an operation should be canceled if the condition defined by the condition code field (CC) has not been satisfied but indicates that an operation should continue if the condition has been satisfied.

Furthermore, referring to FIGS. 7 and 8, the CC and UNCOND signals are used by the register block 1618 to determine if the condition code register 1674 (ccr) should be updated with the C, V, Z, N, VR, or CG flags received from the execution unit (EXU) 1700 during the current execution stage. The condition code register 1674 (ccr) is updated after operations by an instruction that does not have a condition code field (CC) or after operations by instructions that have a condition code field (CC) that indicates that this register should be updated. However, the register is not updated after operations by an instruction that has a condition code field that indicates that the condition code register 1674 (ccr) should not be updated.

Referring back to FIG. 6(a), the immediate data lines 1698 and the X data bus 1102 may contain immediate data provided by the immediate data field ($Address, $Disp, Step Number M, Repeat Count N, $DATA, $Data, $D, $A, $Address/$Data)of an instruction.

The BRKO signal indicates that a break instruction has been decoded. On the other hand, the TRAP0 and TRAP1 signals indicate that a TRAP1 or TRAP0 instruction has been executed. These signals and the associated instructions will be described later in detail.

Referring to FIG. 6(a), the DBLW, REPEAT, LOOP, BRANCH, BREAKOUT, CALL, RETURN, IRETURN, BRETURN signals are respectively generated when a double word instruction, a repeat, a standard loop, a standard branch, a breakout, a call, a call (i.e., subroutine) return, a normal interrupt return, or a break interrupt return instruction is decoded by the instruction decode block 1612. Since the instructions associated with these signals require plural cycles to be executed, the plural cycle state machine 1614 also receives the PCUOP, ALU/BPUOP, MUOP, XBUSOP, YBUSOP, XAUSRC, XAUOP, YAUOP, PCBUSE, XABUSE, YABUSE, XRSEL, YRSEL, and SET signals so that they can be modified in accordance with whichever of the signals DBLW, REPEAT, LOOP, BRANCH, BREAKOUT, CALL, RETURN, IRETURN, BRETURN was received.

The final signal generator 1615 receives the PCUOP, ALU/BPUOP, MUOP, XBUSOP, YBUSOP, XAUSRC, XAUOP, YAUOP, PCBUSE, XABUSE, YABUSE, XRSEL, YRSEL, SET signals from the plural cycle state machine 1614 and the IMMDATA signal from the instruction decode block 1612. Furthermore, it receives from the host command decoder 1611 a SET, XRSEL, and host command request (HCOMRQ) signal and from the interrupt decoder 1613 a XBUSOP, XAUSRC, XAUOP, XABUSE, XRSEL, YRSEL, and interrupt request (IRQ) signals. The final signal generator 1615 issues the final signals PCUOP, ALU/BPUOP, MUOP, XBUSOP, YBUSOP, XAUSRC, XAUOP, YAUOP, PCBUSE, XABUSE, YABUSE, XRSEL, YRSEL, SET and IMMDATA based on a predefined priority scheme. This scheme is as follows: (1) reset host commands (i.e., the host command (HCOM) signal indicates a reset command) or reset (RST) interrupt requests are given highest priority, (2) stall (STALL) signals for arbitration are given second priority, (3) interrupt requests are given third priority, (4) host commands other than a reset command are given fourth priority, and (5) instructions are given last priority.

Referring to FIGS. 5, 8, and 9, the local program control unit (PCU) controller 1550, the local execution unit (EXU) controller 1750, and the local address unit (AU) controller 1850 receive various ones of the signals generated by the common decoder unit 1600. In response, these controllers generate control signals for controlling the program control unit (PCU) 1500, the execution unit (EXU) 1700, and the address unit (AU) 1800 to perform during the execution stage the various operations identified by the signals received from the common decoder unit 1600.

Figure 11:
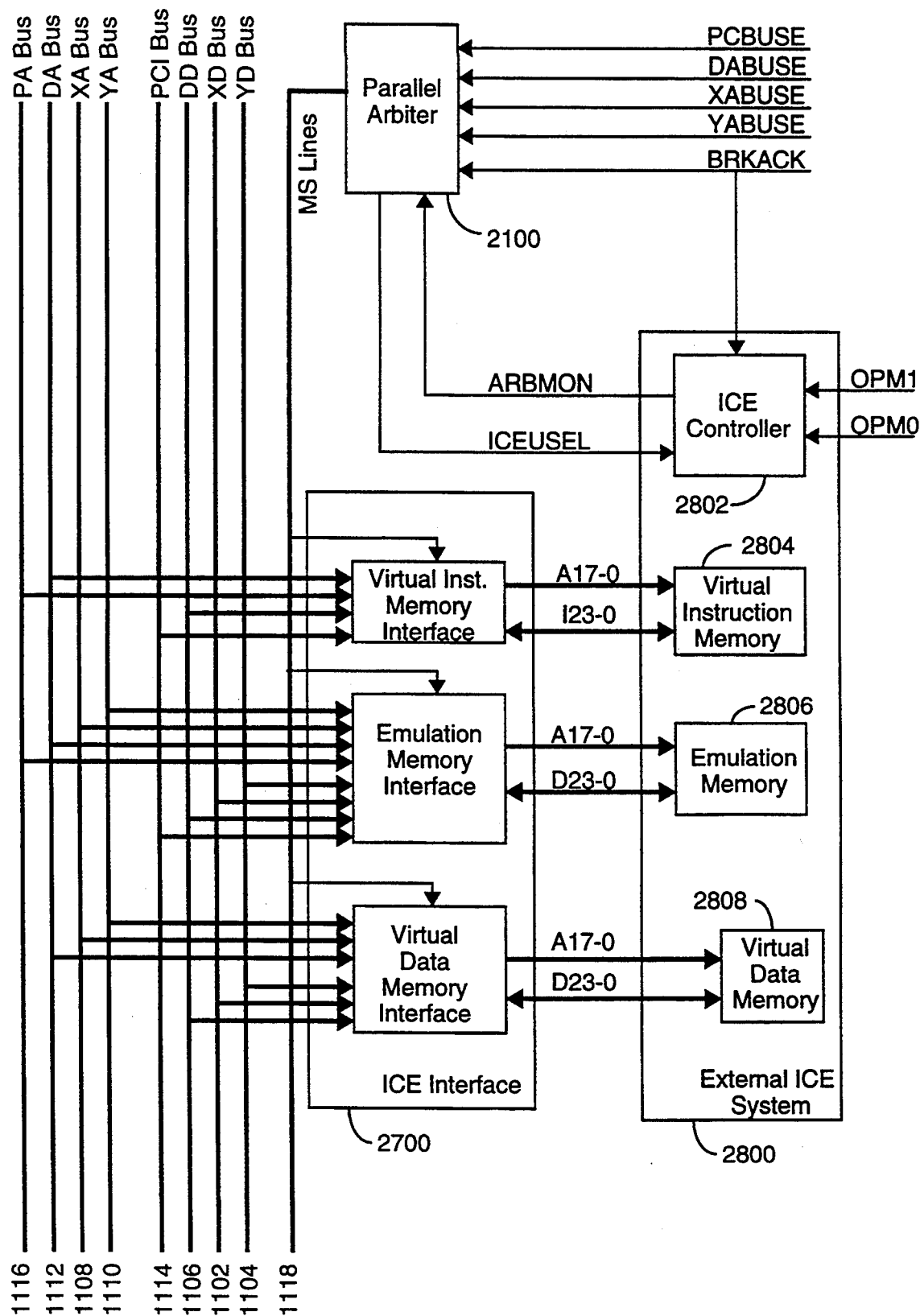
FIG. 11 is a block diagram of the in-circuit emulation (ICE) system of the data processing system.

Furthermore, referring to FIG. 1, during the execution stage, the address unit (AU) 1800 may output onto the X address bus 1108 and the Y address bus 1110 addresses for accessing the data memory 1900, the external memory 2500, the peripheral devices interface 2200, the virtual data memory 2808 shown in FIG. 11. Similar to the virtual instruction memory 2804, the virtual data memory 2808 is physically located off-chip and virtually expands the on-chip data memory 1900 of the DSP 1100.

Referring to FIG. 1, the address or addresses output by the address unit (AU) 1800 is received by the parallel arbiter 2100 from the X address bus 1108 and the Y address bus 1110. At the same time, the parallel arbiter 2100 may also receive an address from the DMAC address bus 1112. The parallel arbiter 2100 decodes the addresses received and resolves any conflicts for accessing the data memory 1900, the external memory 2500, the peripheral devices interface 2200, or the virtual data memory 2808 according to a predefined priority scheme. This scheme is as follows: (1) an address on the DMAC address bus 1112 held over from a previous arbitration is given first priority, (2) an address on the X address bus 1108 is given second priority, (3) an address on the Y address bus 1110 is given third priority, and (4) an address on the DMAC address bus 1112 not held over from a previous arbitration is given last priority.

As a result, the parallel arbiter eventually outputs select lines to the interfaces 2000, 4000, 2200 or 2700 for selecting the X address bus 1108 and the Y address bus 1110 at the appropriate times in order to properly access the data memory 1900, the external memory 2500, the peripheral devices interface 2200, or the virtual data memory 2808. In response, these memories will output data onto the X data bus 1102 and the Y data bus 1104.

Figure 10:
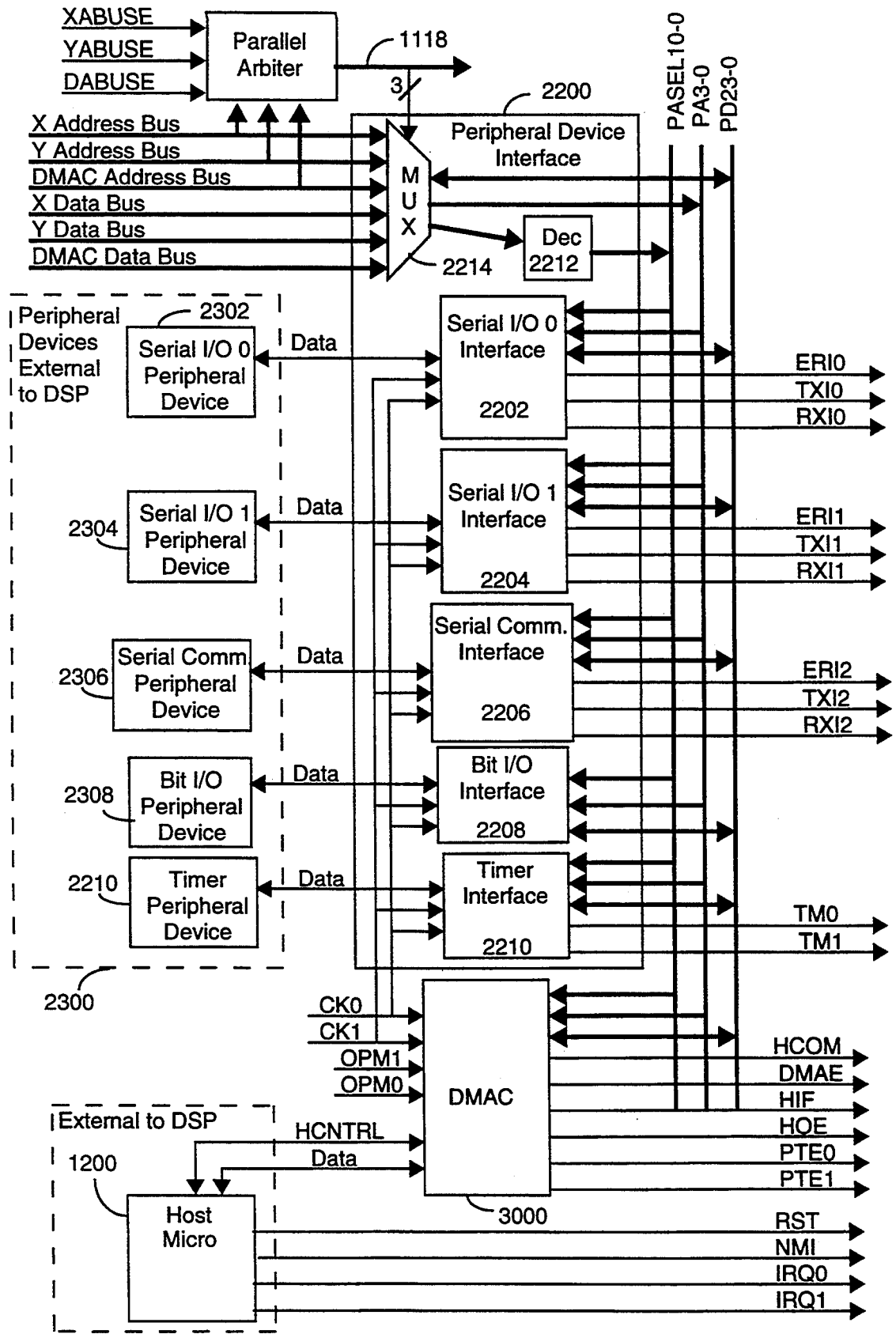
FIG. 10 is a block diagram of the direct memory access controller and the peripheral interface of the digital signal processor and the host microprocessor.

Referring to FIG. 7 and 10, the bit registers 1674-8 and 1674-9 also output the operation mode status bits OPM1 and OPM0 to the DMAC 3000. When the operation mode bits OPM1 and OPM0 indicate the run mode (i.e., OPM1=0 and OPM0=1), the operation mode logic of the DMAC 3000 enables the DMAC 3000 to perform data transfer operations.

Figure 6C:
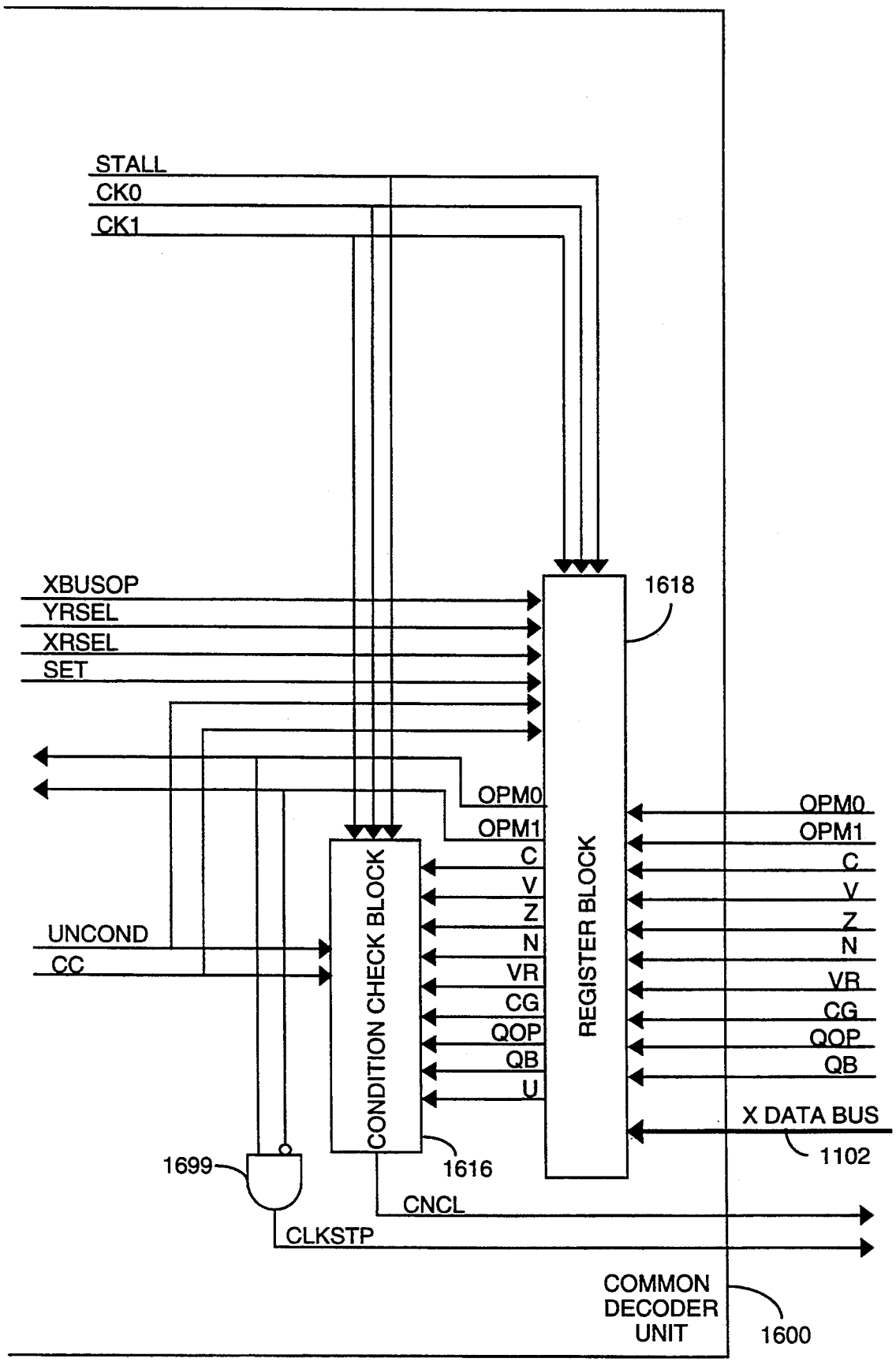

Referring to FIGS. 6(c) and 4, in the run mode, the CLKSTP signal is not asserted by the AND gate 1699 since in the sleep mode both of the operation mode bits OPM1 and OPM0 are set low (i.e., OPM1=0 and OPM0=0). Thus, the clock controller 1304 continues to send a control signal to the clock pulse generator 1302 for outputting the clock signals CK0 and CK1 onto the clock lines 1120. Thus, referring to FIG. 1, the DMAC 3000, the DSP core 3500, the parallel I/O interface 4000, the incircuit emulation interface 2700, and the peripheral devices interface 2200 all operate normally during the run mode.

Sleep Mode

In the sleep mode, the three stage pipeline described in the discussion for the run mode is frozen. Referring to FIG. 7, as will be described later in detail, the sleep mode is activated by an instruction or a host command to set the operation mode status bits OPM1 and OPM0 stored by the bit registers 1674-8 and 1674-9 of the condition code register 1674 (ccr) so that they indicate the sleep mode. In the preferred embodiment, the sleep mode is designated by setting the first operation OPM1 stored by the bit register 1674-8 low and the second operation mode bit OPM1 stored by the bit register 1674-9 high.

The bit registers 1674-8 and 1674-9 output the operation mode bits OPM1 and OPM0 to the final signal generator 1615 of the common decoder unit 1600 as shown in FIGS. 6(b) and (c). In response, the final signal generator 1 61 5 inserts no operation values (NOPs) for the PCUOP, ALU/BPUOP, MUOP, XABUSE, YABUSE, PCBUSE, XAUOP, YAUOP, XABUSOP, and YABUSOP signals if no host command (HCOM) signal or interrupt requests (ITRQ) are received. Referring to FIGS. 5, 8, and 9, because of the NOPs inserted for these signals, the operations of the execution unit (EXU) 1700, the address unit (AU) 1800, and the program control unit (PCU) 1500 are suspended. This freezes the three stage pipeline discussed earlier.

Referring to FIG. 7 and 10, the bit registers 1674-8 and 1674-2 output the operation mode status bits OPM1 and OPM0 to the DMAC 3000. But, when the operation mode bits OPM1 and OPM0 indicate the sleep mode (i.e., OPM1=0 and OPM0=1), the operation mode logic of the DMAC 3000 in response does not suspend operation of the DMAC 3000.

This is done so that the DMAC 3000 can still conduct data transfer operations during the sleep mode.

Furthermore, referring to FIGS. 6(c) and 4, in the sleep mode, the CLKSTP signal is not asserted by the AND gate 1699 since in the sleep mode the first operation mode bit OPM1 is set low (i.e., OPM1=0) and the second operation mode bit OPM0 is set high (i.e., OPM0=1). Thus, as will be explained later in detail, the clock controller 1304 continues to send a control signal to the clock pulse generator 1302 for outputting the clock signals CK0 and CK1 onto the clock lines 1120. Referring to FIG. 1, this is done so that the DMAC 3000, the peripheral devices interface 2200, the parallel I/O interface 4000, and the in-circuit emulation (ICE) system interface 2700 can continue to operate in the sleep mode. In addition, referring to FIG. 6(b), this is also done so that the host command and interrupt decoders 1611 and 1613 of the common decoder unit 1600 can continue to operate in the sleep mode for receiving and processing host command (HCOM) signals and interrupt request vector (ITRQV) signals, as will be explained more fully later.

Software Standby Mode

In the software standby mode, the three stage instruction fetch, decode, and execute pipeline and the operation of the DMAC 3000 are both frozen. Referring to FIG. 7, as with the sleep mode, the software standby mode is activated by an instruction or a host command that sets the operation mode status bits OPM1 and OPM0 stored by the bit registers 1674-8 and 1674-9 so that they indicate the software standby mode. In the preferred embodiment, the software standby mode is designated by setting both of the operation mode bits OPM1 and OPM0 high (i.e., OPM1=1 and OPM0=0).

Referring to FIG. 6(b), as is the case with the sleep mode, when the operation mode bits OPM1 and OPM0 output by the bit registers 1674-8 and 1674-9 indicate the software standby mode, the final signal generator 1615 in response inserts no operation values (NOPs) for the PCUOP, ALU/BPUOP, MUOP, XABUSE, YABUSE, PCBUSE, XAUOP, YAUOP, XABUSOP, and YABUSOP signals. Turning to FIGS. 5, 8, and 9, because of the NOPs inserted for these signals, the operations of the execution unit (EXU) 1700, the address unit (AU) 1800, and the program control unit (PCU) 1500 are suspended. This freezes the three stage pipeline discussed earlier.

Turning to FIGS. 7 and 10, unlike for the sleep mode, when the operation mode bits OPM1 and OPM0 indicate the software standby mode, the operation of the DMAC 3000 is suspended. Furthermore, referring to FIGS. 6(c) and 4, the CLKSTP signal is asserted by the AND gate 1699 since in the software standby mode the operation mode bit OPM1 is set high (i.e. OPM1=1) and the operation mode bit OPM0 is set low (i.e., OPM0=0). In response, the clock controller 1304 sends a control signal for shutting down the clock pulse generator 1302 so that it no longer outputs the clock signals CK0 and CK1 onto the clock lines 1120. Thus, referring to FIG. 1, the operations of the DMAC 3000, the peripheral devices interface 2200, the parallel I/O interface 4000, and the in-circuit emulation (ICE) system interface 2700 are suspended in the software standby mode. In addition, referring to FIG. 6(b), the operations of the host command and interrupt decoders 1611 and 1613 of the common decoder unit 1600 are also suspended.

Break Mode

Referring to FIG. 1, the external in-circuit emulation (ICE) system 2800 is used for developing software and hardware to be used with the DSP 1100. Referring to FIG. 11, as was discussed earlier, the in-circuit emulation (ICE) system includes a controller 2802, a virtual on-chip instruction memory 2804, an emulation external memory 2806, and a virtual on chip-data memory 2808.

As shown in FIG. 11, the controller 2802 of the in-circuit emulation (ICE) system 2800 receives various signals for monitoring the operation of the DSP 1100. These include (a) the operation mode bits OPM1 and OPM0 for monitoring which of the other modes (the run, sleep, or software standby modes) the DSP 1100 is also in, and (b) monitoring signals (ARBMON signals) for monitoring the operation of the parallel arbiter 2100.

If the ARBMON signals identify a predefined condition, the controller 2802 of the in-circuit emulation (ICE) system 2800 may issue a break interrupt (BRK1) request for moving to the break mode. Also, the DSP 1100 can execute a break instruction shown in FIG. 3(h) for generating a software break interrupt (BRK0) request for moving to the break mode when a predefined condition in the condition code field (CC) of the instruction has been satisfied.

As will be described later, when the DSP 1100 is in the break mode, the common decoder unit 1600 issues to the controller 2802 a break acknowledge (BRKAK) signal indicating that a break interrupt has been accepted. Once in the break mode, the DSP 1100 can be in any of the run, sleep, or software standby modes. When the BRKAK signal is also received by the parallel arbiter 2100, it generates select lines on the memory select lines 1120 and provided to the interface 2700 so that all addresses provided on the X address bus 1108, Y address bus 1110, PC address bus 1116, and DMAC address bus 1112 are mapped into the emulation external memory 2806 except for addresses mapped to the data memory 1900, the peripheral devices interface 2200, and the virtual data memory 2808. Thus, referring to FIG. 1, without disturbing the instruction and external memories 1400 and 2500, the in-circuit emulation (ICE) system 2800 can use the DSP core 3500 to implement an evaluation/emulation program stored in the emulation external memory 2806 for evaluating or emulating the performance of the DSP 1100.

But, the controller 2802 can issue to the parallel arbiter 2100 an in-circuit emulation system user select (ICEUSEL) signal for instructing the parallel arbiter 2100 to generate select signals to the interface 2700 for normal accessing of the instruction memory 1400, the data memory 1900, the external memory 2500, the virtual data memory 2808, and the virtual instruction memory 2804. This is so that the DMAC 3000 can access these memories for data transfers conducted by the DMAC 3000 during the break mode and so that the in-circuit emulation (ICE) system can access these memories for evaluation purposes.

SETTING OPERATION MODES

Referring to FIG. 7, the operation mode bits OPM1 and OPM0 stored by the bit registers 1674-8 and 1674-9 of the condition code register 1674 can be set in three ways. Turning to FIG. 2(b), the first is by executing one of the data transfer instruction types 1148, 1150, 1155, 1156, 1160, or 1165 fetched from the instruction memory 1400 or the external memory 2500. The second is by executing the set instruction of the instruction type 1164 shown in FIG. 3(j). And referring to FIG. 1, the third is by executing a host command received from the host microprocessor 1200.

Setting Mode with Data Transfer Instruction

Turning to FIG. 2(b), the instruction types 1148, 1150, 1155, 1156, 1160, or 1165 can be used to indirectly set the operation mode bits OPM1 and OPM0 by moving data into the condition code register 1674 (ccr) (and therefore into the bit registers 1674-8 and 1674-9) during the run mode. This is done by specifying in the transfer destination field (Rn) the appropriate register code for the condition code register 1674 (ccr).

Referring to FIG. 6(a) and (b), when the instruction decode block 1612 decodes one of the instruction types 1148, 1150, 1155, 1156, 1160, or 1165 with a destination specified as the condition code register 1674 (ccr), it generates (a) an XRSEL signal or YRSEL signal (the YRSEL signal only in the case of a move instruction type 1148) which identifies the condition code register 1674 (ccr), and (b) an XBUSOP signal indicating that data is to be loaded from the X data bus 1102 into the register specified by the XRSEL or YRSEL signal. These signals are output by the final signal generator 1615 based on the priority scheme discussed earlier and provided to the condition code register (CCR) controller 1685.

Referring to FIG. 7, in response, the condition code register (CCR) controller 1685 generates control signals for controlling the selector 1686 to provide the condition code register 1674 (ccr) with the data on the X data bus 1102. It also generates a 10 bit UPDATE signal for enabling each of the bit registers 1674-0 to 1674-9 of the condition code register 1674 (ccr) to input the data.

Referring to FIGS. 5, 8, and 9, in the case of register to register (i.e., move) instruction type 1148, the data may be received from one of registers of the DSP 1100 including (a) address registers 1802–1810 (xa0-ya3), and the index registers 1818 and 1820 (i0 and i1) of the address unit (AU) 1800, (b) the individual data registers 1702(a)–1710(c) (xd0g-m11) and the shift control registers 1720 and 1722 (sha and shb) of the execution unit (EXU) 1700, and (c) the program control registers 1502 and 1505 (pc0 and pc3), the repeat control registers 1508–1510 (rc, rs, and re), and the loop control register 1511 (lc) in the program control unit (PCU) 1500. Referring to FIG. 1, in the case of instruction types 1155, 1156, 1160, or 1165, the data is received from the data memory 1900, the external memory 2500, or the peripheral device interface 2300. And turning to FIG. 6(a), in the case of instruction type 1150 the data is immediate data extracted from the immediate data field ($DATA) and provided directly onto the X data bus 1102.

However, during the sleep or software standby modes, this cannot be done. This is because, as was indicated earlier, the three stage pipeline is frozen during these modes and therefore these types of instructions cannot be fetched, decoded, or executed.

Setting Modes with Set Instruction

Turning to FIGS. 2(b) and 7, during the run mode, the instruction type 1164 can be used to directly set the operation mode bits OMP1 and OMP0. This is done with the set instruction shown in FIG. 3(j) by specifying the appropriate mode in the mode definition area.

Referring to FIG. 6(a) and 6(b), when the instruction decode block 1612 decodes the instruction type 1164, it generates (a) a SET signal for setting the operation mode bits OPM1 and OPM0 stored by the bit registers 1674-8 and 1674-9, and (b) an XRSEL signal which identifies how the operation mode bits OPM1 and OPM0 are to be set. These signals are output by the final signal generator 1615 based on the priority scheme discussed earlier and provided to the condition code register (CCR) controller 1685.

Referring to FIG. 7, in view of the operation mode identified by the XRSEL signal, the controller 1685 generates control signals provided to the selector 1686 for selecting the appropriate "1" or "0" binary value to be provided to the bit registers 1674-8 and 1674-9 for setting the operation mode bits OPM1 and OPM0 to these values. It also generates an UPDATE signal for enabling the bit registers 1674-8 and 1674-9 to store the "1" or "0" binary values provided by the selector 1686 as the operation mode bits OPM1 and OPM0.

However, during the sleep or software standby modes, the set instruction cannot be used. This is because, as was indicated earlier, the three stage pipeline is frozen during these modes and therefore this type of instruction cannot be fetched, decoded, or executed.

Setting Modes with Host Commands

Referring to FIG. 10, the DMAC 3000 includes a host interface function that enables the host microprocessor 1200 to communicate with the DSP 1100. Thus, the host microprocessor can issue host control (HCNTRL) signals to the DMAC 3000 for instructing the DSP 1100 to set the operation mode bits OPM1 and OPM0 of the condition code register 1674 (ccr) to indicate the run, sleep, or software standby mode. In response, the DMAC 3000 issues a 4 bit host command or instruction (HCOM) signal that identifies to which mode the bits OPM1 and OPM0 stored by the bit registers 1674-8 and 1674-9 are to be set.

As shown in FIG. 6(b), the HCOM signal is received by the host command decoder 1611. In response, it generates (a) a SET signal for setting the operation mode bits OPM1 and OPM0 stored by the bit registers 1674-8 and 1674-9, (b) an XRSEL signal which identifies how the operation mode bits OPM1 and OPM0 are to be set, and (c) a host command acknowledge (HCOMAK) signal indicating that a host command has been received. The SET, XRSEL, and HCOMAK signals are then eventually output by the final signal generator 1615 based on the priority scheme discussed earlier and provided to the condition code register (CCR) controller 1685.

Referring to FIG. 7, in view of the operation mode identified by the XRSEL signal, the condition code register (CCR) controller 1685 generates control signals provided to the selector 1686 for selecting the appropriate "1" or "0" binary value to be provided to the bit registers 1674-8 and 1674-9 for setting the operation mode bits OPM1 and OPM0 to these values. It also generates an UPDATE signal for enabling the bit registers 1674-8 and 1674-9 to store the "1" or "0" binary values provided by the selector 1686 as the operation mode bits OPM1 and OPM0.

Unlike the set and data transfer instructions used for setting the operation mode bits OPM1 and OPM0, the HCOM signal can be issued by the DMAC 3000 and decoded by the host command decoder 1611 during both the run and sleep modes. But, because the DMAC 3000 is not operational during the software standby mode, it cannot generate a HCOM signal during this mode.

INTERRUPT HANDLING

The DSP 1100 can handle number of different types of interrupt requests. Referring to FIG. 3(j), these include software interrupt requests generated in response to executing the break interrupt or trap interrupt instruction. Referring to FIGS. 10 and 11, these may include external interrupt requests generated in response to interrupt commands received from the host microprocessor 1200 or in-circuit emulation (ICE) system 2800. These interrupt requests may also include peripheral interrupts generated by the DMAC 3000 or the peripheral device interfaces 2202-2206 and 2210. And finally, referring to FIGS. 5, 8, and 9, these interrupt requests may include error status interrupt requests generated by the program control unit 1500, the execution unit 1700, or the address unit 1800.

Software Interrupts

Referring again to FIG. 2(b), the instruction type 1164 can be used to generate software interrupt requests. As shown in FIG. 3(j), this is done by executing a break interrupt or trap interrupt instruction. The break interrupt instruction may be used to move the operation of the DSP 1100 from the run mode to the earlier described break mode of operation when the condition specified in the condition code field (CC) is satisfied. The trap interrupt instruction allows a software generated interrupt to interrupt the run mode with an instruction when the condition specified in the condition code field (CC)is satisfied.

Referring to FIG. 6(a), when the instruction decode block 1612 decodes the break instruction, it generates a one bit software break (BRK0) interrupt request for requesting a break interrupt. If the decoded instruction is one of the two trap instructions, then the instruction decode block 1612 generates a two bit trap (TRAP0 and TRAP1) interrupt request for requesting whichever one of the two trap interrupt instructions was decoded. The TRAP0, TRAP1, and BRK0 signals are then output by the common decoder unit 1600 and provided to the interrupt controller 1609 shown in FIG. 12.

Referring to FIG. 6(c), if the condition specified in the condition code field (CC) has not been satisfied, then the instruction decode block generates a CNCL signal which indicates that the interrupt operation should be canceled. Otherwise, the CNCL signal indicates that the condition has been satisfied. The CNCL signal is received by the program control unit controller 1550 shown in FIG. 5 which generates control signals for cancelling or continuing branching to a routine for handling the break or trap interrupt request.

However, during the sleep or software standby modes, the software break and trap interrupt requests cannot be generated. This is because the three stage pipeline is frozen during these modes and therefore the break and trap interrupt instructions cannot be fetched, decoded, or executed.

External, Peripheral, and Error Status Interrupts

Referring to FIG. 10, the host microprocessor 1200 can issue several external interrupts. These include (a) a reset (RST) interrupt request for resetting the DSP 1100, (b) a non-maskable (NMI) interrupt request, and (c) two user defined (IRQ1 and IRQ0) interrupt requests.

The first and second serial I/O interfaces (Serial I/O 0 and Serial I/O 1) 2202 and 2204 and the serial communication interface (SCI) 2206 can each issue three peripheral interrupt requests. These are (a) an over-run (ERI0, ERI1, and ERI2) interrupt request for indicating when a data over-run occurs, (b) an end data receive (RXI0, RXI1, and RXI2) interrupt request for indicating that an operation for receiving data has been completed and a data transfer operation by the DSP core 3500 involving the received data is now requested, and (c) an end data transmit (TXI0, TXI1, and TXI2) interrupt request for indicating that an operation for transmitting data has been completed and a new data transfer operation by the DSP core 3500 for providing the peripheral interface with data to be transmitted is now requested.

The event timer interface (Timer) 2210 can issue two peripheral interrupt requests. These are (a) a timer input (TM1) interrupt request for event time acquisition, input pulse frequency and width measurements, or input counter or register overflows, (b) a timer output (TM0) interrupt request for output pulse measurements or output counter overflows.

The DMAC 3000 can issue five peripheral interrupt requests. These are (a) a DMAC end data transfer (DMAE) interrupt request for indicating that a local DMAC data transfer operation has been completed and a data transfer operation by the DSP core 3500 is now requested, (b) a host input data register full (HIF) interrupt request for when the host input data register of the DMAC 3000 is full and a data transfer operation by the DSP core 3500 for transferring this data is now requested, (c) a host output data register empty (HOE) interrupt request for when the host output data register of the DMAC 3000 is empty and a data transfer operation by the DSP core 3500 for providing this register with new data is now requested, (d) a first peripheral interface operation end (PTE0) interrupt request for indicating that a first operation by one of the peripheral interfaces 2202–2210 has been completed and a data transfer operation by the DSP core 3500 is now requested, and (e) a second peripheral interface operation end (PTE1) interrupt request for indicating that a second operation by one of the peripheral interfaces 2202–2210 has been completed and a data transfer operation by the DSP core 3500 is now requested. However, the DMAC 3000 can only issue these interrupt requests during the run or sleep mode since it is not operational during the software standby mode.

Referring to FIG. 15, the in-circuit emulation (ICE) system can issue a BRK1 interrupt request. Unlike the BRK0 interrupt request, the BRK1 interrupt request is for moving from the run, sleep, or software standby modes to the break mode.

Referring to FIG. 4, the clock controller 1304 of the timing unit 1300 receives the NMI, RST, and BRK1 interrupt requests. If the operation mode bits OPM1 and OPM0 received by the clock controller 1304 indicate the run or sleep mode, then the clock controller 1304 immediately synchronizes any received interrupt request with the input reference clock CLK signal. But, as was mentioned earlier, if the OPM1 and OPM0 bits indicate the software standby mode, the clock pulse generator has been disabled. Therefore, when one of the NMI, RST, or BRK1 interrupt requests is received, the clock controller 1304 first generates a control signal for waking up the clock pulse generator 1302. It then waits for the time designated in the wakeup counter 1306 for synchronizing the received interrupt request with the CLK signal. This is done so that the clock signals CK0 and CK1 received by the interrupt controller 2600 can be stabilized prior to whichever of the synchronized NMI, RST, or BRK1 interrupt requests is received by the interrupt controller 2600.

Error Status Interrupt Requests

Referring to FIG. 5, the adder 1506 of the program control unit 1500 can generate a program address overflow error (PCVR) signal. This occurs whenever the program address computed by the adder 1506 overflows the allowable number of bits (18 in the preferred embodiment) or when a prohibited address is computed by the adder 1506 and stored in the program control register 1502 (pc0).

Referring to FIG. 8, the ALU 1712 or the bit processing unit (BPU) 1714 of the execution unit (EXU) 1700 can generate an over range error (VR) signal. This occurs whenever the data computed by the ALU 1712 or the bit processing unit (BPU) 1714 overflows the allowable number of bits (56 in the preferred embodiment).

Referring to FIG. 9, the X address unit 1812 and the Y address unit 1814 of the address unit (AU) 1800 can generate memory address overflow error (XAUVR and YAUVR) signals. This occurs whenever the address computed by the X address unit 1812 or the Y address unit 1814 overflows the allowable number of bits (18 in the preferred embodiment) or when a prohibited address is computed by one of these addresses units.

As will be explained shortly, if any of the PCVR, VR, XAUVR, YAUVR error signals are received, the interrupt controller 2600 generates and outputs only one error status interrupt request.

Interrupt Controller

Figure 12:
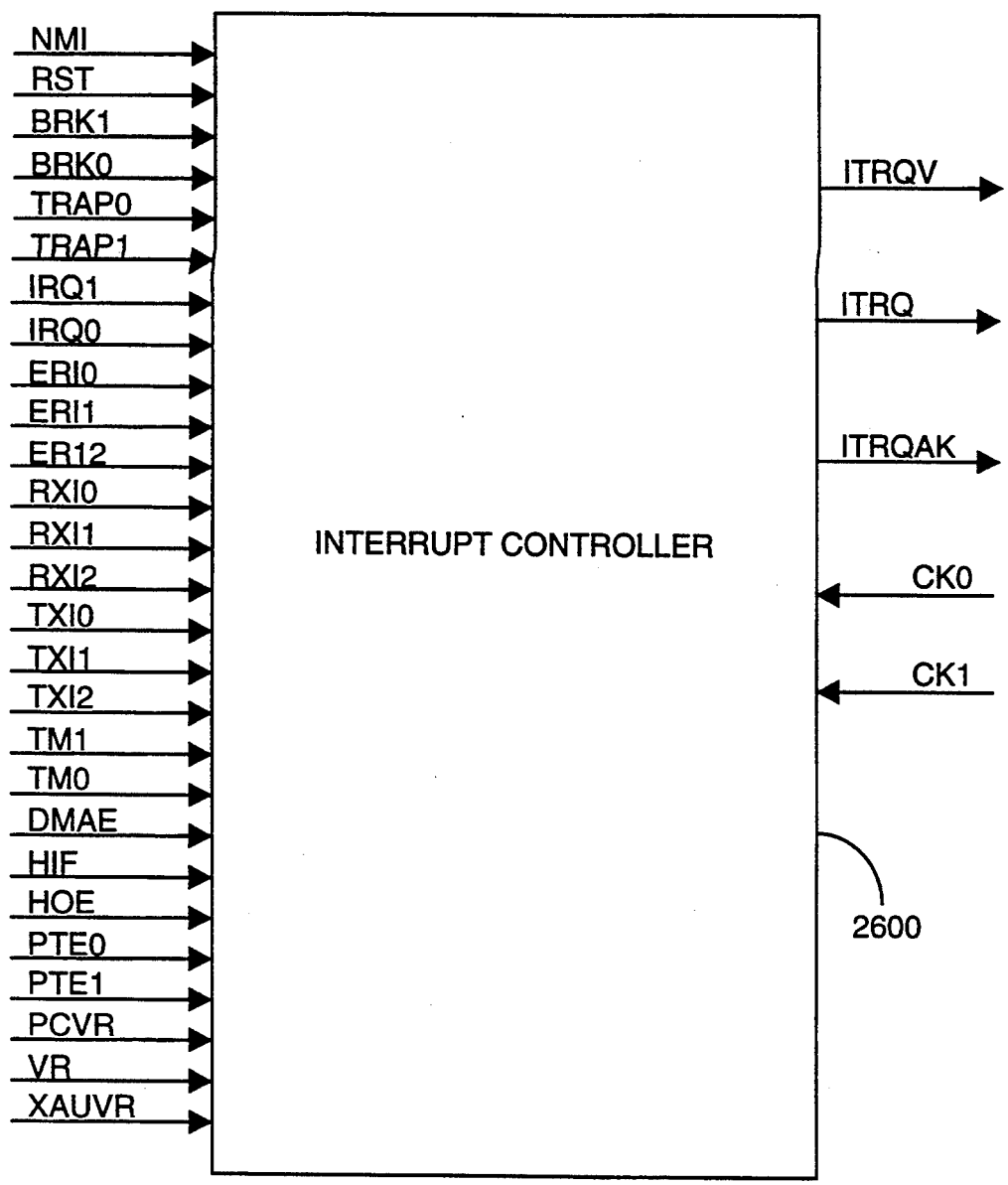
FIG. 12 is a block diagram of the interrupt controller of the digital signal processor.

Referring to FIG. 12, as was suggested earlier, the interrupt controller 2600 can receive and process the NMI, RST, and BRK1 interrupts in any of the run, sleep, software standby modes. This is because (a) the host microprocessor 1200 and the in-circuit emulation (ICE) system operate independent of the clock pulse generator 1302 and the operation mode bits OPM1 and OPM0, (b) the CK0 and CK1 clock signals are always received by the interrupt controller 2600 in the run and sleep modes, and (c) as was indicated earlier, the timing unit 1300 outputs the CK0 and CK1 clock signals in the software standby in response to receiving an external NMI, RST, or BRK1 interrupt request.

The interrupt control circuit 2600 however will only receive and process the TRAP0, TRAP1, and BRK0 interrupt requests in the run mode. This is due to the fact that otherwise the three stage instruction fetch, decode, and execute pipeline is frozen during the sleep and software standby modes.

Moreover, the interrupt control circuit 2600 can receive the external IRQ1, IRQ0, ERI0, ERI1, ERI2, RXI0, RXI1, RXI2, TXI0, TXI1, TXI2, TM1, and TM0 interrupt requests during any mode but can only process them during the run or sleep modes. This is because, unlike the NMI and RST interrupt requests, the IRQ1 and IRQ0 interrupt requests are provided directly to the interrupt controller 2600 and therefore cannot wakeup the clock pulse generator 1302 shown in FIG. 4 in the software standby mode.

In addition, the DMAE, HIF, HOE, PTE0, and PTE1 interrupt requests can be received and processed only during the run or sleep modes. This is because, the DMAC 3000 is not operational during the software standby mode.

Moreover, the PCVR, VR, XAUVR, YAUVR, and IOPE interrupt requests can be received and processed only during the run mode. This is because the three stage instruction fetch, decode, and execute pipeline is frozen during the sleep and software standby modes.

When the interrupt controller 2600 receives and processes an interrupt request that has not been masked, it generates a 5 bit interrupt request code vector (ITRQV) signal which identifies whichever of interrupt request was received. But, if any of the PCVR, VR, XAUVR, YAUVR error signals are received, the ITRQV signal only indicates that an error status interrupt has been requested. The interrupt controller 2600 also generates an interrupt request (ITRQ) signal which indicates that an interrupt has been requested.

Interrupt Decoder, Final Signal Generator, Execution

Referring to FIG. 6(b), the interrupt decoder 1613 receives the ITRQV and ITRQ signals. When the ITRQ signal is received, the interrupt decoder 1613 uses three machine cycles to decode and handle each of the interrupt requests identified by the ITRQV signal. Thus, the interrupt decoder 1613 includes a state machine for handing each of these requests over three machine cycles.

But, in the preferred embodiment, the interrupt decoder 1613 and its state machine handle and decode BRK0 and BRK1 interrupt requests identified by the ITRQV signal slightly different than for the standard other types of interrupt requests described earlier. Since three machine cycles are required to decode and handle the interrupt request, three machine cycles are required to execute the interrupt request.

Break Interrupt Requests

If the received ITRQV signal identifies that a BRK1 or BR0 interrupt for moving to the break mode is being requested, then the state machine of the interrupt decoder 1613 outputs in the first machine cycle of the break interrupt request and handling process (a) a PCUOP signal indicating a branch to the address provided on the immediate data lines 1698, (b) an IMMM-DATA signal representing an interrupt vector address to be provided on the immediate data lines 1698, (c) an XRSEL signal for selecting the contents of the condition code register 1674 (ccr) shown in FIG. 7 to be moved over the X data bus 1102, (d) a YRSEL signal for selecting condition code stacking register 1697 (ccrstck) for receiving the data on the X data bus 1102, (e) a XBUSOP signal indicating that a register to register (i.e., move) operation is to be performed, and (f) a break interrupt request acknowledge (BRKAK) signal indicating that the break interrupt request has been received.

Since the interrupt decoder 1613 also outputs the interrupt request acknowledge ITRQAK signal to the final signal generator 1615, the PCUOP, IMMDATA, XRSEL, YRSEL, and XBUSOP signals generated by the state machine of the interrupt decoder 1613 are given priority (based on the priority scheme discussed earlier) and outputted by the final signal generator 1615 along with the BRKAK and ITRQAK signals. Referring to FIG. 12, in response to the ITRQAK signal, the interrupt controller 2600 stops asserting the ITRQ signal and the ITRQV signal no longer identifies the interrupt request that was received. This is done so that the interrupt controller can issue the next interrupt request received. Furthermore, referring to FIG. 11, in response to the BRKAK signal, as was discussed earlier, the parallel arbiter will generate in the break mode select signals provided to the interface 2700 on the select lines 1118 so that all addresses provided on the X address bus 1108, Y address bus 1110, PC address bus 1116, and DMAC address bus 1112 are mapped into the emulation external memory 2806 except for address which map to the data memory 1900 and the on-chip virtual data memory 2808.

Referring to FIG. 5, in the first machine cycle of the break interrupt execution process, the local program control unit (PCU) controller 1550, in response to the PCUOP signal generates control signals to the selector 1518, the adder 1506, the selector 1516, and the program control register 1502 for storing the interrupt vector address provided by the immediate data lines 1698 in the program control register 1502 (pc0). Referring to FIG. 11, this address specifies an address in the emulation external memory 2806 where the first instruction for the BRK1 or BRK0 interrupt handling routine is located or where a double word branching instruction (i.e., instruction type 1162 in FIG. 2) for branching to the first instruction of this handling routine is located.

At the same time, referring to FIG. 7, the condition code register controller 1685, in response to the XRSEL, YRSEL, and XDBUSOP signals generates control signals sent to the condition code register 1674 (ccr), the selector 1687, and the condition code stacking register 1697 (ccrstck) for moving/pushing the contents of the condition code register 1674 (ccr) into the condition code stacking register 1697 (ccrstck). Thus, the current operation mode bits OPM1 and OPM0 stored by the bit registers 1674-8 and 1674-9 are stored in the bit regsiters 1697-8 and 1697-9 of the stacking register 1697 (ccrstck) and indicate the mode of operation (run, sleep, or software standby) that the DSP 1100 was in prior to entering the break mode.

In the second machine cycle of the break interrupt decoding and handling process, the state machine of the interrupt decoder 1613 generates (a) an XRSEL signal for setting the OPM1 and OPM0 bits of the bit registers 1674-8 and 1674-9 shown in FIG. 7 to indicate the run mode, and (b) a SET signal for setting these bits. These signals are given priority by the final signal generator 1615 since the IRQ signal was received by it.

In the second machine cycle of the break interrupt execution process, the condition code register controller 1685 generates, in response to the XRSEL and SET signals, control signals provided to the selector 1686 and an UPDATE signal provided to the condition code register 1674 (ccr) for setting the operation mode bits OPM1 and OPM0 stored by the bit registers 1674-8 and 1674-9 to indicate the run mode.

In the third and last machine cycle of the break interrupt decoding and handling process, the state machine of the interrupt decoder 1613 generates (a) an XRSEL signal for selecting the contents of the program control register 1505 (pc3) shown in FIG. 5 to be moved onto the X data bus 1102, (b) a YRSEL signal for selecting the program control stacking register 1513 (pcstck) shown in FIG. 5 for receiving the data on the X data bus 1102, and (c) a XBUSOP signal indicating that a register to register (i.e., move) operation is to be performed. As before, these signals are given priority by the final signal generator 1615 since the IRQ signal was received by it.

Referring to FIG. 5, for the third machine cycle of the break interrupt execution process, the program control unit (PCU) controller 1550, in response to the XRSEL, YRSEL, and XDBUSOP signals generates control signals sent to the buffer 1530 and the program control stacking register 1513 (pcstck) for moving/pushing the address stored by the program control register 1505 (pc3) into the program control stacking register 1513 (pcstck). This address is the return program address for when the DSP 1100 exits the break mode and is the address of an instruction that immediately followed a break (BRK0 interrupt request) instruction or the address of an instruction being fetched when the BRK1 interrupt request was first received.

The DSP 1100 exits the break mode when the DSP 1100 is also in the run mode and a break return instruction (bretum in FIG. 3(j)) in the interrupt handling routine is fetched, decoded, and executed in the three stage pipeline described earlier. Referring to FIG. 6(a), in the first machine cycle of the break interrupt return process, the instruction decode block 1612 decodes this instruction and generates (a) a BRETURN signal for indicating that a break return instruction has been decoded, (b) an XRSEL signal for selecting the contents of the program control stacking register 1513 (pcstck) shown in FIG. 5 to be moved onto the X data bus 1102, (c) a YRSEL signal for selecting the program control register 1502 (pc0) for receiving the data on the X data bus 1102, and (d) a XBUSOP signal indicating that a register to register (i.e., move) operation is to be performed.

The XRSEL, YRSEL, and XBUSOP signals are then provided to the plural state machine 1614 which passes them on to the final signal generator 1615. The final signal generator 1615 outputs these signals based on the earlier discussed priority scheme.

As a result, referring to FIG. 5, the program control unit (PCU) controller 1550, in response to the XRSEL, YRSEL, and XDBUSOP signals, generates control signals sent to the buffer 1533, the selector 1516, and the program control register 1502 (pc0) for moving/pushing the address in the program control stacking register 1513 (pcstck) into the program control register 1502 (pc0). As was indicated earlier, this is the break return program address for when the DSP 1100 exits the break mode.

Furthermore, the plural cycle state machine 1614 receives the BRETURN signal as well. In response, it issues for the next machine cycle of the break interrupt return process (a) an XRSEL signal for selecting the contents of the condition code stacking register 1697 (ccrstck) shown in FIG. 7 to be moved over the X data bus 1102, (b) a YRSEL signal for selecting the condition code register 1674 (ccr) for receiving the data on the X data bus 1102, (c) a XBUSOP signal indicating that a register to register (i.e., move) operation is to be performed, and (d) NOP values for the PCUOP, ALU/B-PUOP, MUOP, YBUSOP, XAUSRC, XAUOP, YAUOP, PCBUSE, XABUSE, YABUSE, and SET signals.

The XRSEL, YRSEL, and XBUSOP signals are then provided to the plural state machine 1614 which passes them on to the final signal generator 1615. The final signal generator 1615 outputs these signals based on the earlier discussed priority scheme.

As a result, referring to FIG. 7, the condition code register controller 1685, in response to the XRSEL, YRSEL, and XDBUSOP signals, generates control signals sent to the buffer 1698 and the condition code register 1674 (ccr) for moving/pushing the contents of the condition code stacking register 1697 (ccrstck) into the condition code register 1674 (ccr). Thus, the operation mode bits OPM1 and OPM0 that were stored in the bit registers 1697-8 and 1697-9 that are now loaded into the bit registers 1674-8 and 1674-9 of the condition code register 1674 indicate the mode of operation (run, sleep, or software standby) that the DSP 1100 was in prior to entering the break mode. In other words, upon return from a routine for handling a break interrupt, the DSP enters this mode.

Standard Interrupt Requests

The process just described for the BRK0 and BRK1 interrupt requests is similar to that for the remaining standard interrupt requests described earlier. However, there are some significant differences.

If the received ITRQV signal identifies that one of the standard other types of interrupts is being requested, then the state machine of the interrupt decoder 1613 outputs in the first machine cycle of the standard interrupt request and handling process (a) the PCUOP and IMMMDATA signals for branching to the interrupt handling routine, (b) an XRSEL signal for setting the OPM1 and OPM0 bits stored by the bit registers 1674-8 and 1674-9 shown in FIG. 7 to indicate the run mode, and (c) a SET signal for setting these bits.

Since the interrupt decoder also outputs the interrupt request acknowledge ITRQAK signal to the final signal generator 1615, the PCUOP, IMMDATA, and XRSEL signals generated by the state machine of the interrupt decoder 1613 are given priority (based on the priority scheme discussed earlier) and outputted by the final signal generator 1615 along with the ITRQAK signal. Referring to FIG. 12, in response to the ITRQAK signal, the interrupt controller 2600 stops asserting the ITRQ signal and the ITRQV signal no longer identifies the interrupt request that was received so that the interrupt controller can now issue the next interrupt request received.

In the first machine cycle of the standard interrupt execution process, as with the BRK0 and BRK1 interrupt requests, the program control register 1502 stores the interrupt vector address provided by the immediate data lines 1698 as shown in FIG. 5. At the same time, the condition code register controller 1685 generates, in response to the XRSEL and SET signals, control signals provided to the selector 1686 and an UPDATE signal provided to the condition code register 1674 (ccr) for setting the operation mode bits OPM1 and OPM0 stored by the bit registers 1674-8 and 1674-9 to the run mode.

In the second machine cycle of the standard interrupt decoding process, the state machine of the interrupt decoder 1613 generates (a) an XAUOP and XAUSRC signal for selecting the stack pointer register 1816 (sp) shown in FIG. 9 to output onto the X address bus 1110 a stacking address for the data memory 1900, the external memory 2500, or the in-circuit emulation (ICE) system 2800, (b) an XRSEL signal for selecting the contents of the condition code register 1674 (ccr) shown in FIG. 7 to be moved onto the X data bus 1102, and (c) an XBUSOP signal indicating that a store to memory data transfer operation is to be performed.

Referring to FIG. 7, during the second machine cycle of the standard interrupt execution process, the condition code register (CCR) controller 1685, in response to the XRSEL and XDBUSOP signals generates control signals sent to the selector 1687 for pushing the contents of the condition code register 1674 (ccr) onto the X data bus 1102. Turning to FIG. 9, the controller 1850 generates in response to the XAUOP and XAUSRC signals control signals for selecting the stack pointer register 1816 (sp) shown in FIG. 9 to output onto the X address bus 1110 a stacking address. As a result, the contents of the condition code register 1674 (ccr) outputted on the X data bus 1102 is stored in the stacking area of the data memory 1900, the external memory 2500, or the virtual data memory 2808.

Furthermore, the controller 1850 generates control signals for controlling the X address unit (XAU) 1812 to post decrement the address contents of the first stack pointer register 1816 (sp) so that it contains the stacking address for the next push operation. At the same time, the address contents of the second stack pointer register 1817 (sp+1) are decremented so that the new address that it stores is the address in the first stack pointer register 1816 (sp) incremented by one. In other words, the address in the second stack pointer register is the address of where the contents of the condition code register 1674 (ccr) are located.

This is different than for the BRK0 and BRK1 interrupt requests in that the operation mode bits OPM1 and OPM0 and the other contents of the condition code register 1674 (ccr) are stored in a stacking memory area rather than in a stacking register. Furthermore, since the operation mode bits OPM1 and OPM0 stored in the stacking area were set to indicate the run mode in the first machine cycle of the interrupt execution process, these stored bits do not indicate the mode (run, sleep, or software standby) that the DSP 1100 was in just prior to the receipt of the interrupt request as was the case for the BRK0 and BRK1 interrupt requests.

In the third machine cycle of the standard interrupt decoding process, the state machine of the interrupt decoder 1613 generates (a) an XAUOP and XAUSRC signal for again selecting the stack pointer register 1816 (sp) shown in FIG. 9 to output onto the X address bus 1110 a stacking address for the data memory 1900, the external memory 2500, or the in-circuit emulation (ICE) system 2800, (b) an XRSEL signal for selecting the contents of the program control register 1505 (pc3) shown in FIG. 5 to be moved onto the X data bus 1102, and (c) an XBUSOP signal indicating that a load to memory data transfer operation is to be performed.

Referring to FIG. 5 again, during the third machine cycle of the standard interrupt execution process, the controller 1550, in response to the XRSEL and XDBUSOP signals generates control signals sent to the buffer 1530 for pushing the contents of the program control register 1505 (pc3) onto the X data bus 1102. Turning to FIG. 9, the controller 1850 generates in response to the XAUOP and XAUSRC signals control signals for selecting the stack pointer register 1816 (sp) shown in FIG. 9 to output onto the X address bus 1110 the next stacking address. As a result, the return address outputted by the program control register 1505 (pc3) on the X data bus 1102 is stored in the stacking area of the data memory 1900, the external memory 2500, or the virtual data memory 2808. This is different than for the BRK0 and BRK1 interrupt requests only in that the return program address is stored in a stacking are rather than in a stacking register.

Furthermore, similar to what was described earlier, the controller 1850 generates control signals for controlling the X address unit (XAU) 1812 to post decrement the address of the first stack pointer register 1816 (sp). And, at the same time, the address contents of the second stack pointer register 1817 (sp+1) are decrmented so that its new address is the address in the stack pointer register 1816 (sp) incremented by one. Thus, this address points to the address in the stacking area where the interrupt return address is located.

The DSP 1100 exits these interrupts with the DSP 1100 in the run mode when a standard interrupt return instruction (ireturn in FIG. 3(j))in the interrupt handling routine is fetched, decoded, and executed in the three stage pipeline described earlier. Referring to FIG. 6(a), in the first machine cycle of the standard interrupt return process, the instruction decode block 1612 decodes this instruction and generates (a) a IRETURN signal for indicating that an interrupt return instruction has been decoded, (b) an XAUOP and XAUSRC signal for selecting the stack pointer register 1816 (sp) shown in FIG. 9 to output onto the X address bus 1110 the stacking address of the data memory 1900, the external memory 2500, or the in-circuit emulation (ICE) system 2800 which stores the return program address, (c) an XRSEL signal for selecting the program control register 1502 (pc0) shown in FIG. 5 to receive the address on the X data bus 1102, and (d) an XBUSOP signal indicating that a load from memory data transfer operation is to be performed.

The XAUOP, XAUSRC, and XRSEL signals are then provided to the plural state machine 1614 which passes them on to the final signal generator 1615. The final signal generator 1615 outputs these signals based on the earlier discussed priority scheme.

Referring to FIG. 9, in response to the XAUOP and XAUSRC signals, the local address unit (AU) controller 1850 generates control signals for controlling the stack pointer register 1816 (sp) to output the stacking address onto the X address bus 1108. At the same time, the program control unit (PCU) controller 1550, in response to the XRSEL and XBUSOP signals, generates control signals sent to the buffer 1520, the selector 1516, and the program control register 1502 (pc0) for loading the return address on the X data bus 1102 into the program control register 1502 (pc0).

Furthermore, the controller 1850 generates control signals for controlling the X address unit (XAU) 1812 to post increment the first stack pointer register 1816 (sp) so that it contains the stacking address for the next push operation. At the same time, the address contents of the second stack pointer register 1817 (sp+1) are incremented so that the new address it now stores is the address in the first stack pointer register 1816 (sp) incremented by one. In other words, the address in the second stack pointer register is the address where the contents of the condition code register 1674 (ccr) are located.

Furthermore, the plural cycle state machine 1614 receives the IRETURN signal as well. In response, it issues for the next machine cycle for the standard interrupt return process (a) an XAUOP and XAUSRC signal for selecting the stack pointer register 1816 (sp) shown in FIG. 9 to output onto the X address bus 1110 the stacking address of the data memory 1900, the external memory 2500, or the in-circuit emulation (ICE) system 2800 which stores the earlier stacked contents of the condition code register 1674 (ccr), (b) an XRSEL signal for selecting the condition code register 1674 (ccr) shown in FIG. 7 to receive the data on the X data bus 1102, (c) an XBUSOP signal indicating that a load from memory data transfer operation is to be performed, and (d) NOP values for the PCUQP, ALU/BPUOP, MUOP, YBUSOP, XAUSRC, XAUOP, YAUOP, PCBUSE, XABUSE, YABUSE, and SET signals.

The XAUSRC, XAUOP, and XRSEL signals are then provided to the plural state machine 1614 which passes them on to the final signal generator 1615. The final signal generator 1615 outputs these signals based on the earlier discussed priority scheme.

Referring to FIG. 9, in response to the XAUOP and XAUSRC signals, the local address unit (AU) controller 1850 generates control signals for controlling the second stack pointer register 1817 (sp+1) to output the address of the stacking area where the contents of the condition code register 1674 (ccr) are stored onto the X address bus 1108. At the same time, the condition code register (CCR) controller 1685, in response to the XRSEL and XBUSOP signals, generates control signals sent to the selector 1686 and the condition code register 1674 (ccr) for loading the earlier stacked contents back into the condition code register 1674 (ccr). The operation mode bits OPM1 and OPM0 that were stored in the stacking area and that are now loaded into the bit registers 1674-8 and 1674-9 of the condition code register 1674 indicate the run mode of operation. Thus, upon return from a routine for handling a standard interrupt, the DSP enters the run mode.

Furthermore, similar to what was described earlier, the controller 1850 generates control signals for controlling the X address unit (XAU) 1812 to post increment the address of the first stack pointer register 1816 (sp). And, at the same time, the address contents of the second stack pointer register 1817 (sp+1) are incremented so that the new address it stores is the address in the stack pointer register 1816 (sp) incremented by one. Thus, this address points to the next address for a pop operation.

ALTERNATIVE EMBODIMENTS

In the preferred embodiment just described, a program control stacking register 1513 (pcstck) and a condition code stacking register 1697 (ccrstck) were employed for break interrupt requests in order to stack the contents of the program control register 1505 (pc3) and the condition code register 1674 (ccr) during the break mode. However, for the other standard interrupt requests, the stack pointers 1816 (sp) and 1817 (sp+1) of the address unit (AU) 1800 were used for stacking the contents of these registers during the handling of the interrupt request. The reason for doing this is that the break interrupts (BRK1 and BRK0) should be transparent to the current user program. Therefore, it is desirable to have separate stacking registers 1513 and 1697 so that portions of the stacking area cannot be consumed during the break interrupt request.

However, one skilled in the art will appreciate that the stack pointers 1816 (sp) and 1817 (sp+1) can be used instead of the stacking registers 1513 and 1697 for stacking the contents of the program control register 1503 (pc3) and the condition code register 1674 (ccr) for the break interrupt requests as well. Alternatively, the stack pointer registers 1816 (sp) and 1817 (sp+1) can be used with the condition code stacking register 1697 (ccrstck) so that the contents of the program control register 1505 (pc3) are stacked by the stack pointer registers 1816 (sp) and 1817 (sp+1) and the contents of the condition code register 1674 (ccr) are stacked by the stacking register 1697 (ccrstck). Moreover, the stack pointer registers 1816 (sp) and 1817 (sp+1) can be used with the program control stacking register 1513 (pcstck) so that the contents of the condition code register 1674 (ccr) are stacked by the stack pointer registers 1816 (sp) and 1817 (sp+1) and the contents of the program control register 1505 (pc3) are stacked by the program control stacking register 1513 (pcstck).

Furthermore, in the preferred embodiment, the operation mode bits OPM1 and OPM0 stored by the bit registers 1674-8 and 1674-9 of the condition code register 1674 (ccr) were stacked (i.e., stored) indicating the current operation mode (run, sleep, or software standby) that the DSP 1100 was in when the break interrupt was received. This is done so that the DSP 1100 can return to the stored mode when the break mode is completed.

However, for the other standard interrupt requests, the operation mode bits OPM1 and OPM0 were first set to the run mode and then stacked. The reason for doing this is so that these standard interrupts can be used to wake up the DSP core 3500 from the sleep mode and enter it into the run mode. However, one skilled in the art will appreciate that for all or some of these standard interrupt requests the operation mode bits can be stacked so that they indicate the mode of operation that the DSP 1100 was in when the interrupt request was received.

While the present invention has been described with reference to a few specific embodiments, the description is illustrative of the invention and is not to be construed as limiting the invention. Specifically, although the invention described herein has been discussed in the context of a digital signal processor, it is equally applicable to other data processing devices including microprocessors. Furthermore, various modifications may occur to those skilled in the art without departing from the true spirit and scope of the invention as defined by the appended claims.

What is claimed is:

1. A data processor comprising:
a data processing core unit for performing data processing operations;
said data processing core unit including an interrupt controller for receiving interrupt signals, said received interrupt signals including a break interrupt request signal and a plurality of standard interrupt request signals;
said data processing core unit including a condition code register for storing condition code values including a data processor mode control value;
said data processing core unit including a condition code stacking register for storing condition code values received from said condition code register; and
a data memory including a data stacking area for storing specified data values;
said data processing core unit including mode control means coupled to said condition code register for suspending data processing operations by said data processing core unit when said data processor mode control value is set to a predefined "sleep mode" value and for enabling data processing operations by said data processing core unit when said data processor mode control value is set to a predefined "run mode" value;
said data processing core unit including an interrupt decoder, coupled to said interrupt controller, for generating condition code register control signals to operate on said data processor mode control value in accordance with each received interrupt request signal;
said interrupt decoder including a state machine for responding to a received break interrupt request signal by generating: (A) first, condition code register control signals to copy said data processor mode control value stored in said condition code register into said condition code stacking register, (B) second, condition code register control signals to set said data processor mode control value to said predefined "run mode" value;
said interrupt decoder state machine responding to a received standard interrupt request signal by generating: (A) first, condition code register control signals to set said data processor mode control value to said predefined "run mode" value; and (B), second, condition code register control signals to copy said data processor mode control value stored in said condition code register into said data stacking area;

said data processing core unit including a condition code controller for setting said data processor mode control value and copying said data processor mode control value in accordance with said condition code register control signals.

2. The data processor of claim 1 wherein:

said mode control means suspends data processing operations by said data processing core unit when said data processor mode control value is set to a predefined "software standby mode" value;

said data processor further includes a direct memory access (DMA) controller for performing data transfer operations, said DMA controller including means for suspending operation of said DMA controller when said data processor mode control value is set to said predefined "software standby mode" value and for enabling data transfer operations by said DMA controller when said data processor mode control value is set to said predefined "run mode" value and when said data processor mode control value is set to said predefined "sleep mode" value.

3. The data processor of claim 1 wherein:

said interrupt decoder further responding to a received break interrupt request signal by generating a first program branching signal while generating said condition code register control signals to copy said data processor mode control value stored in said condition code register into said condition code stacking register; and said data processing core unit including means for executing a predefined break interrupt service routine in response to said first program branching signal.

4. The data processor of claim 1 further comprising:

a first program counter register for storing a first instruction address;

a program stacking register for storing an instruction address received from said first program counter register;

a second program counter register for storing a second instruction address;

said interrupt decoder state machine responding to each received break interrupt request signal by generating control signals to copy said first instruction address from said second program counter register to said program stacking register;

said interrupt decoder state machine responding to a predefined break return instruction by generating (A) control signals to copy said first instruction address from said program stacking register to said first program counter register, and (B) condition code register control signals to copy said data processor mode control value stored in said condition code stacking register into said condition code register;

said interrupt decoder state machine responding to each received standard interrupt request signal by generating control signals to copy said first instruction address from said second program counter register to said data stacking area; and said interrupt decoder state machine responding to a predefined standard interrupt return instruction by generating (A) control signals to copy said first instruction address from said data stacking area to said first program counter register, and (B) condition code register control signals to copy said data processor mode control value stored in said data stacking area into said condition code register.

5. A data processor comprising:

a data processing core unit for performing data processing operations;

said data processing core unit including an interrupt controller for receiving interrupt signals, said received interrupt signals including a break interrupt request signal and a plurality of standard interrupt request signals;

said data processing core unit including a condition code register for storing condition code values including a data processor mode control value;

stacking storage for storing specified data values;

said data processing core unit including mode control means coupled to said condition code register for suspending data processing operations by said data processing core unit when said data processor mode control value is set to a predefined "sleep mode" value and for enabling data processing operations by said data processing core unit when said data processor mode control value is set to a predefined "run mode" value;

said data processing core unit including an interrupt decoder, coupled to said interrupt controller, for generating condition code register control signals to operate on said data processor mode control value in accordance with each received interrupt request signal;

said interrupt decoder including a state machine for responding to a received break interrupt request signal by generating: (A) first, condition code register control signals to copy said data processor mode control value stored in said condition code register into said stacking storage, (B) second, condition code register control signals to set said data processor mode control value to said predefined "run mode" value;

said interrupt decoder state machine responding to a received standard interrupt request signal by generating: (A) first, condition code register control signals to set said data processor mode control value to said predefined "run mode" value; and (B), second, condition code register control signals to copy said data processor mode control value stored in said condition code register into said stacking storage;

said data processing core unit including a condition code controller for setting said data processor mode control value and copying said data processor mode control value in accordance with said condition code register control signals.

6. A method of handling interrupt requests for interrupting a data processor comprising the steps of:

receiving interrupt signals including a break interrupt request signal and a plurality of standard interrupt request signals;

storing in a condition code register of said data processor condition code values including a data processor mode control value;

suspending data processing operations by said data processor when said data processor mode control value is set to a predefined "sleep mode" value;

enabling data processing operations by said data processor when said data processor mode control value is set to a predefined "run mode" value;

responding to a break interrupt request signal by generating: (A) first, condition code register control signals to copy said data processor mode control value stored in said condition code register into a condition code stacking register of said data processor, (B) second, condition code register control signals to set said data processor mode control value to said predefined "run mode" value;

responding to a standard interrupt request signal by generating: (A) first, condition code register control signals to set said data processor mode control value to said predefined "run mode" value; and (B), second, condition code register control signals to copy said data processor mode control value stored in said condition code register into a data memory of said data processor that includes a data stacking area; and setting said data processor mode control value and copying said data processor mode control value in accordance with said condition code register control signals.

7. The method of claim 6 further comprising the steps of:

suspending data processing operations by said data processor when said data processor mode control value is set to a predefined "software standby mode" value;

suspending data transfer operations by a direct memory access (DMA) controller of said data processor when said data processor mode control value is set to said predefined "software standby mode" value and enabling data transfer operations by said DMA controller when said data processor mode control value is set to a predefined "run mode" and when said data processor mode control value is set to a predefined "sleep mode".

8. The method of claim 6 further comprising the steps of:

responding to a received break interrupt request signal by generating a first program branching signal while generating said condition code register control signals to copy said data processor mode control value stored in said condition code register into said condition code stacking register; and executing a predefined break interrupt service routine in response to said first program branching signal.

9. The method of claim 6 further comprising the steps of:

storing in a first program counter register of said data processor a first instruction address;

responding to each received break interrupt request signal by generating control signals to copy said first instruction address from said first program counter register to a program stacking register of said data processor;

responding to a predefined break return instruction by generating (A) control signals to copy said first instruction address from said program stacking register to a second program counter register of said data processor, and (B) condition code register control signals to copy said data processor mode control value stored in said condition code stacking register into said condition code register;

responding to each received standard interrupt request signal by generating control signals to copy said first instruction address from said first program counter register to said data stacking area; and responding to a predefined standard interrupt return instruction by generating (A) control signals to copy said first instruction address from said data stacking area to said second program counter register, and (B) condition code register control signals to copy said data processor mode control value stored in said data stacking area into said condition code register.

10. A method for handling interrupt requests for interrupting a data processor comprising the steps of:

receiving interrupt signals including a break interrupt request signal and a plurality of standard interrupt request signals;

storing in a condition code register of said data processor condition code values including a data processor mode control value;

suspending data processing operations by said data processing unit when said data processor mode control value is set to a predefined "sleep mode" value;

enabling data processing operations by said data processing unit when said data processor mode control value is set to a predefined "run mode" value;

responding to a received break interrupt request signal by generating: (A) first, condition code register control signals to copy said data processor mode control value stored in said condition code register into a stacking storage of said data processor, (B) second, condition code register control signals to set said data processor mode control value to said predefined "run mode" value;

responding to a standard interrupt request signal by generating: (A) first, condition code register control signals to set said data processor mode control value to said predefined "run mode" value; and (B), second, condition code register control signals to copy said data processor mode control value stored in said condition code register into said stacking storage; and setting said data processor mode control value and copying said data processor mode control value in accordance with said condition code register control signals.

* * * * *